(12) United States Patent
Matsumoto

(10) Patent No.: US 8,374,003 B2
(45) Date of Patent: Feb. 12, 2013

(54) ISOLATED SWITCHING POWER SUPPLY APPARATUS

(75) Inventor: Tadahiko Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 80 days.

(21) Appl. No.: 13/157,459

(22) Filed: Jun. 10, 2011

(65) Prior Publication Data

US 2011/0305043 A1  Dec. 15, 2011

(30) Foreign Application Priority Data

Jun. 11, 2010  (JP) .................................. 2010-134252

(51) Int. Cl.
*H02M 3/335* (2006.01)
(52) U.S. Cl. .................... 363/21.01; 363/95; 363/21.08; 363/21.16
(58) Field of Classification Search ......... 363/20–21.18, 363/84, 95
See application file for complete search history.

(56) References Cited

U.S. PATENT DOCUMENTS

| | | | |
|---|---|---|---|
| 4,683,528 A * | 7/1987 | Snow et al. ................ | 363/21.15 |
| 5,841,641 A * | 11/1998 | Faulk ......................... | 363/21.14 |
| 5,952,849 A | 9/1999 | Haigh | |
| 6,262,600 B1 | 7/2001 | Haigh et al. | |
| 6,301,135 B1 * | 10/2001 | Mammano et al. ............ | 363/95 |
| 6,525,566 B2 | 2/2003 | Haigh et al. | |
| 6,671,189 B2 * | 12/2003 | Jansen et al. ............... | 363/21.14 |
| 6,873,065 B2 | 3/2005 | Haigh et al. | |
| 6,903,578 B2 | 6/2005 | Haigh et al. | |
| 7,075,329 B2 | 7/2006 | Chen et al. | |
| 7,209,372 B2 * | 4/2007 | Jang et al. .................. | 363/21.14 |
| 7,545,059 B2 | 6/2009 | Chen et al. | |
| 7,683,654 B2 | 3/2010 | Chen et al. | |
| 7,692,444 B2 | 4/2010 | Chen et al. | |
| 7,719,305 B2 | 5/2010 | Chen | |
| 7,821,797 B2 * | 10/2010 | Nishiyama et al. ............ | 363/17 |

FOREIGN PATENT DOCUMENTS

JP  2002-272097 A  9/2002

* cited by examiner

*Primary Examiner* — Jessica Han
(74) *Attorney, Agent, or Firm* — Keating & Bennett, LLP

(57) ABSTRACT

A control IC including a full-bridge circuit is disposed on a primary side and a secondary side. Bidirectional communication is performed between the primary side and the secondary side in a state in which they are isolated. A control signal output from the primary side or the secondary side earlier is preferentially processed. As a result, the authority to control a switching element can be freely given to a primary-side control IC or a secondary-side control IC, and any control processing can be performed with software.

10 Claims, 20 Drawing Sheets

OPERATION IN PERIOD FROM
TIME T0 TO TIME T1

OPERATION AT TIME T1

OPERATION IN PERIOD FROM TIME T1 TO TIME T2

OPERATION AT TIME T2

OPERATION IN PERIOD FROM TIME T2 TO TIME T3

OPERATION IN PERIOD FROM TIME T3 TO TIME T4

OPERATION IN PERIOD FROM TIME T4 TO TIME T5

OPERATION AT TIME T5

OPERATION IN PERIOD FROM TIME T5 TO TIME T6

OPERATION AT TIME T6

OPERATION IN PERIOD FROM TIME T6 TO TIME T7

OPERATION IN PERIOD FROM TIME T7 TO TIME T8

ISOLATED SWITCHING POWER SUPPLY APPARATUS

BACKGROUND OF THE INVENTION

1. Field of the Invention

The present invention relates to an isolated switching power supply apparatus arranged to perform control processing in a plurality of modes including a soft start mode, a sleep mode, a hiccup mode, and a latch mode.

2. Description of the Related Art

In isolated switching power supply apparatuses, in order to use different ground potentials in a primary circuit and a secondary circuit and to satisfy a safety standard, a primary side and a secondary side are isolated using a transformer. In order to control an output voltage and an output current of the secondary side, the output voltage and the output current of the secondary side are detected and are then fed back to the primary side and a switching circuit on the primary side is controlled based on the detected output voltage and the detected output current. At that time, a feedback circuit also needs to achieve the isolation between the primary side and the secondary side.

When a synchronous rectification circuit is used on the secondary side, in order to prevent a case in which a main switch and a commutation-side synchronous rectifier are turned on at the same time and a flow-through current flows, it is necessary to turn off the commutation-side synchronous rectifier in a secondary-side synchronous rectification circuit immediately before the main switch is turned on. Accordingly, a signal indicating a time immediately before the main switch is turned on must be transmitted from a primary side to the secondary side so as to control a time of switching performed by the secondary-side synchronous rectification circuit (see, for example, Japanese Unexamined Patent Application Publication No. 2002-272097). FIG. 1 illustrates a basic configuration of an isolated DC-DC converter disclosed in Japanese Unexamined Patent Application Publication No. 2002-272097.

Referring to FIG. 1, a main switch 2 is subjected to switching control in accordance with a control signal output from a primary-side control circuit 5. The primary-side control circuit 5 detects an output voltage Vo via an isolation circuit 10 and outputs a control signal C1 for controlling a duty ratio of the main switch 2 based on the output voltage Vo. The control signal C1 is also transmitted to a secondary side via driving circuits 7 and 8 and a transformer 9 and becomes a control signal C2. The control signal C2 is supplied to a secondary-side control circuit 21. The control signal C2 is transmitted from the secondary-side control circuit 21 to an input terminal of a driving circuit 13 and a gate electrode of a transistor 15. As a result, a rectification-side synchronous rectifier 3 is driven in phase with the main switch 2, and a commutation-side synchronous rectifier 4 is driven in opposite phase with the main switch 2.

A time difference between the control signals C1 and C2 that is caused by the driving circuits 7 and 8 and the transformer 9 and a delay time of turning off a MOSFET in the commutation-side synchronous rectifier are adjusted by a delay circuit 11 for delaying turning on of the main switch.

As illustrated in FIG. 1, when a synchronous rectification circuit is used on the secondary side, at least two units including a unit for feeding back an output voltage detection signal to the primary side are required to transmit a signal between the primary side and the secondary side while providing the isolation between the primary side and the secondary side. Therefore, a circuit configuration becomes complicated.

As disclosed in Japanese Unexamined Patent Application Publication No. 2002-272097, since a drive voltage Vcc is not supplied to a secondary-side control circuit at the time of activation (soft start) such as power-up, it is desirable that a method of causing a primary-side control circuit to determine a main switch turn-on time and a main switch turn-off time be used. In a sleep mode in which a switching frequency is reduced to reduce a fixed loss under light-load conditions, it is desirable that a method of causing one of the primary-side control circuit and the secondary-side control circuit including an output current detection element to determine the main switch turn-on time be used. Using this method, a switching frequency can be reduced depending on light-load conditions. In particular, when an output current is detected using a drop in voltage at a secondary-side synchronous rectifier or a secondary-side choke coil and a switching frequency is reduced in accordance with the detected output current, it is desirable that a method of causing the secondary-side control circuit to determine the main switch turn-on time be used. In addition, when an output voltage is directly detected and then the output voltage is stabilized by adjusting the duty ratio of a main switch, it is desirable that a method of causing the secondary-side control circuit to determine the main switch turn-off time be used. However, it is difficult to flexibly authorize the primary-side control circuit or the secondary-side control circuit to determine the main switch turn-on time and the main switch turn-off time.

SUMMARY OF THE INVENTION

To overcome the problems described above, preferred embodiments of the present invention provide an isolated switching power supply apparatus arranged to appropriately perform control processing under any conditions by flexibly authorizing a primary-side control circuit or a secondary-side control circuit to determine a main switch turn-on time and a main switch turn-off time.

An isolated switching power supply apparatus according to a preferred embodiment of the present invention preferably includes a direct-current input power supply, a power transmission transformer including a primary winding and a secondary winding, at least one main switching element arranged to perform switching control on a direct-current voltage applied to the primary winding of the power transmission transformer, a rectification circuit that includes at least one rectification switching element and is connected to the secondary winding of the power transmission transformer, a smoothing circuit connected to the secondary winding of the power transmission transformer, and a control circuit including a primary control unit arranged to control the main switching element, a secondary control unit arranged to control the rectification switching element, and an isolated signal bidirectional transmission element connected between the primary control unit and the secondary control unit. An input/output conversion ratio is preferably controlled in accordance with a duty ratio of the main switching element. The isolated signal bidirectional transmission element provides a signal transmission path via which a timing signal corresponding to a turn-on time or a turn-off time of the main switching element can be transmitted between a primary side and a secondary side. The primary control unit preferably includes at least one primary drive switch arranged to drive the isolated signal bidirectional transmission element, a primary digital control unit arranged to control a time of driving of the primary drive switch, and a primary detection unit arranged to detect an output of the isolated signal bidirectional transmission element. The secondary control unit preferably includes at least one secondary drive switch arranged to drive the isolated signal bidirectional transmission element, a secondary digital control unit arranged to control a time of driving of the secondary drive switch, and a secondary detection unit arranged to detect an output of the isolated signal bidirectional transmission element. The primary detection unit and the secondary detection unit are arranged to turn on or turn off the main switching element and the rectification switching element, respectively, when detecting the timing signal, and the main switching element or the rectification switching element is turned on or turned off in response to the timing signal that has been transmitted earlier from the primary control unit or the secondary control unit.

The timing signal preferably includes an ON timing signal generated when the main switching element is turned on and an OFF timing signal generated when the main switching element is turned off. One of the primary control unit and the secondary control unit which has transmitted the ON timing signal earlier determines a switching frequency. One of the primary control unit and the secondary control unit which has transmitted the OFF timing signal earlier performs a feedback operation. The input/output conversion ratio is controlled in accordance with the duty ratio of the main switching element.

One of the primary control unit and the secondary control unit which does not transmit the ON timing signal earlier preferably includes a switching operation stop unit arranged to stop generation of the ON timing signal and terminate a switching operation.

The isolated switching power supply apparatus preferably further includes an output current detection unit arranged to directly or indirectly detect an output current. When the output current detection unit detects a light-load condition, a power saving operation is performed to set an ON timing signal generation cycle to be longer than that in a heavy-load condition, to reduce a switching frequency, and to reduce a fixed loss resulting from switching of each switching element.

The rectification switching element is preferably a synchronous rectifier, for example. When the light-load condition is detected, an ON period of the synchronous rectifier shorter than that in the heavy-load condition is set, or the synchronous rectifier is maintained in an OFF state and backflow of a current to the synchronous rectifier is prevented.

The isolated signal bidirectional transmission element is preferably a signal transmission transformer, for example, that is connected between the primary control unit and the secondary control unit and includes a primary winding and a secondary winding.

The isolated signal bidirectional transmission element is preferably a first capacitor connected between the primary control unit and the secondary control unit. A second capacitor is preferably connected between a ground at the primary control unit and a ground at the secondary control unit and functions as a return path for a current passing through the first capacitor.

The switching operation stop unit in the secondary control unit terminates the switching operation by shutting off driving power to the secondary control unit transmitted from the primary side to the secondary side via the isolated signal bidirectional transmission element.

The timing signal, which is bidirectionally transmitted between the primary side and the secondary side via the isolated signal bidirectional transmission element, is preferably a substantially square wave signal, for example, including a fundamental wave of the switching frequency, and is switched between a high level and a low level when the main switching element is turned on or turned off.

The timing signal, which is bidirectionally transmitted between the primary side and the secondary side via the isolated signal bidirectional transmission element, is preferably an edge signal, for example, including a fundamental wave of a frequency greater than the switching frequency, and is generated when the main switching element is turned on or turned off.

According to various preferred embodiments of the present invention, the following advantages and effects are obtained. An auxiliary power supply for a secondary-side control circuit is not needed. Since both a primary side and a secondary side can take the lead in performing control processing, various control operations and various protection operations can be performed. Since only a single isolated signal bidirectional transmission element is used, a footprint and a cost of the isolated switching power supply apparatus are reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
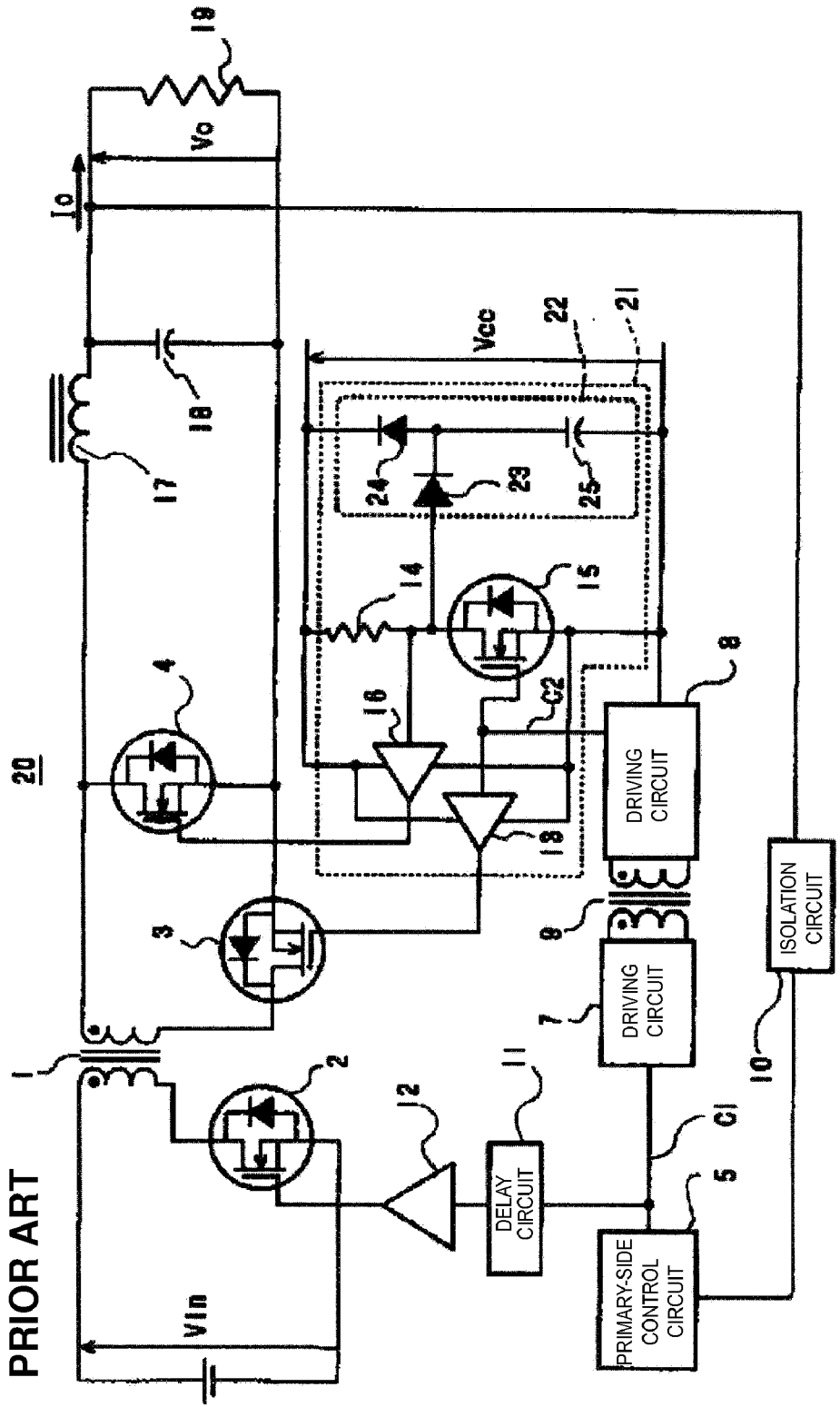
FIG. 1 is a diagram illustrating a basic configuration of a known isolated DC-DC converter.
Figure 2:
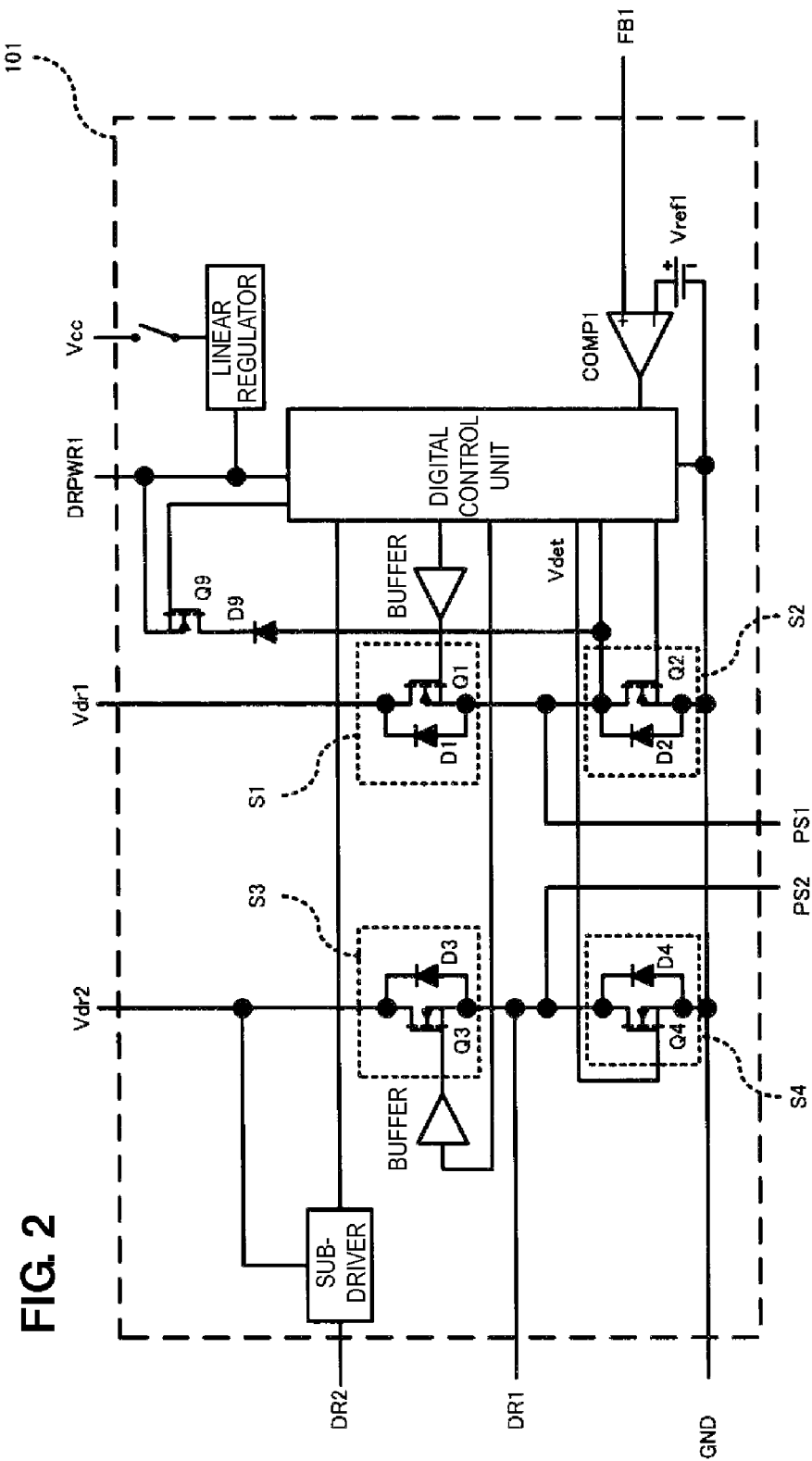
FIG. 2 is an internal block diagram of a control IC included in a switching power supply apparatus according to a first preferred embodiment of the present invention.

FIG. 2 is an internal block diagram of a control IC 101 included in an isolated switching power supply apparatus according to the first preferred embodiment of the present invention. The control IC 101 preferably includes series circuits and a digital control unit. One of the series circuits includes a first switching circuit S1 and a second switching circuit S2. The other one of the series circuits includes a third switching circuit S3 and a fourth switching circuit S4. The first switching circuit S1 includes a first switching element Q1 and a first diode D1 that are connected in parallel. The second switching circuit S2 includes a second switching element Q2 and a second diode D2 that are connected in parallel. The third switching circuit S3 includes a third switching element Q3 and a third diode D3 that are connected in parallel. The fourth switching circuit S4 includes a fourth switching element Q4 and a fourth diode D4 that are connected in parallel. The digital control unit outputs a control signal to control turning on/off of each of the switching circuits S1 to S4.

A first pulse signal terminal PS1 and a second pulse signal terminal PS2 arranged to be connected to an inductance element are disposed at the node between the first switching circuit S1 and the second switching circuit S2 and the node between the third switching circuit S3 and the fourth switching circuit S4, respectively. One ends of the series circuit including the first switching circuit S1 and the second switching circuit S2 and the series circuit including the third switching circuit S3 and the fourth switching circuit S4 are connected to a ground terminal GND, and the other ends of the series circuit including the first switching circuit S1 and the second switching circuit S2 and the series circuit including the third switching circuit S3 and the fourth switching circuit S4 are connected to a first power supply terminal Vdr1 and a second power supply terminal Vdr2, respectively. That is, the switching circuits S1 to S4 define a full-bridge circuit, and control signals are individually transmitted from the digital control unit to the first switching circuit S1 and the third switching circuit S3 that are high-side switches via buffers that are high-side drivers.

A first drive terminal DR1 is disposed at the node between the third switching circuit S3 and the fourth switching circuit S4. The first drive terminal DR1 outputs, as a first drive signal, energy supplied from the first power supply terminal Vdr1 via the first pulse signal terminal PS1 and the second pulse signal terminal PS2 when the first switching circuit S1 and the fourth switching circuit S4 are turned on and the second switching circuit S2 and the third switching circuit S3 are turned off in response to a signal output from the digital control unit. A detection terminal Vdet1 arranged to detect a potential at the node between the first switching circuit S1 and the second switching circuit S2 is disposed at the node, and is connected to the digital control unit.

A sub-driver Subdr and a second drive terminal DR2 are preferably provided. The sub-driver Subdr preferably obtains power from, for example, the second power supply terminal Vdr2 and outputs a second drive signal in response to a signal output from the digital control unit. The second drive signal is output from the second drive terminal DR2.

A first comparator COMP1 and a first reference voltage source Vref1 are preferably provided. The first reference voltage source Vref1 is connected to the first comparator COMP1, and a signal output from the first comparator COMP1 is input into the digital control unit.

A driving power supply terminal Vcc of a control IC and a driving power supply terminal DRPWR1 of the digital control unit are preferably provided. In general, a drive voltage for a digital control circuit is a low voltage ranging from approximately 0.8 V to approximately 3.3 V, for example, and a drive voltage for a power semiconductor element is a high voltage ranging from approximately 5 V to approximately 15 V, for example. Accordingly, when a single type of power supply voltage is supplied, a linear regulator or a switching regulator including the inductance element, a ninth diode D9, and a ninth switching circuit S9 steps down a voltage supplied from the driving power supply terminal Vcc of the control IC to a drive voltage for the digital control unit and supplies the voltage to the digital control unit. The ninth switching circuit S9 is controlled by the digital control unit.

Figure 3:
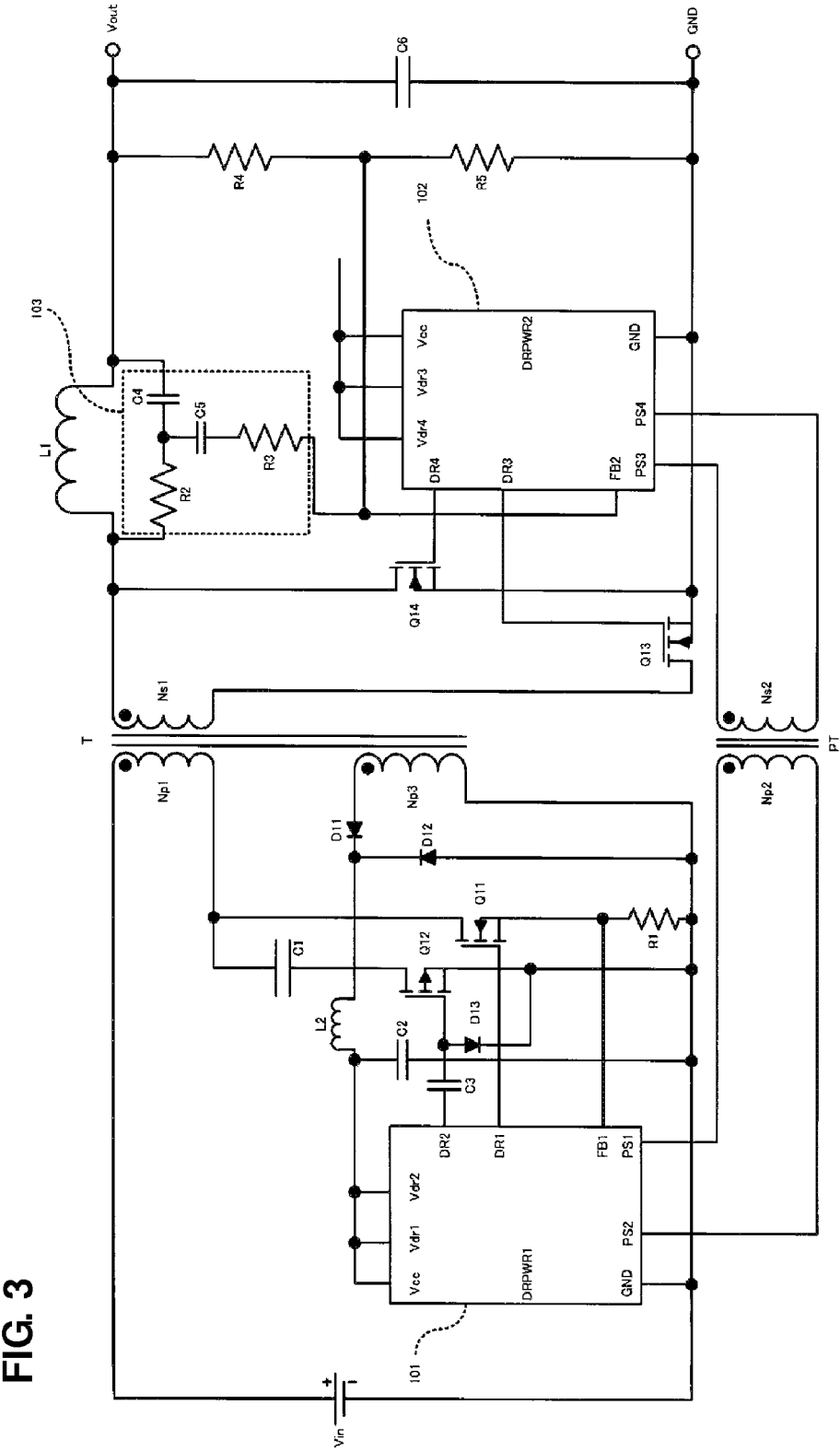
FIG. 3 is a diagram illustrating an exemplary circuit in a switching power supply apparatus according to the first preferred embodiment of the present invention.

FIG. 3 is a circuit diagram of an isolated DC-DC converter according to the first preferred embodiment including the control IC illustrated in FIG. 2.

A primary winding Np1 of a transformer T and a series circuit including an eleventh switching element Q11 and a first resistor R1 are connected to both ends of a direct-current input power supply Vin. A series circuit including a first capacitor C1 and a twelfth switching element Q12 that is a p-channel MOSFET is connected in parallel to the eleventh switching element Q11.

A synchronous rectification circuit preferably including a thirteenth switching element Q13 functioning as a rectification-side synchronous rectifier and a fourteenth switching element Q14 functioning as a commutation-side synchronous rectifier is connected to both ends of a secondary winding Ns1 of the transformer T. A direct-current voltage is output to an output terminal Vout via a smoothing circuit including a first inductor L1 and a sixth capacitor C6.

In order to obtain drive voltages at the driving power supply terminal Vcc, the first power supply terminal Vdr1, and the second power supply terminal Vdr2 and control the eleventh switching element Q11, a control terminal of the eleventh switching element Q11 and the first drive terminal DR1 of the primary-side control IC 101 are connected. In order to control the twelfth switching element Q12, a control terminal of the twelfth switching element Q12 and the second drive terminal DR2 of the primary-side control IC 101 are connected via a level shift circuit including a third capacitor C3 and a thirteenth diode D13. In order to detect a current passing through the eleventh switching element Q11 using the first resistor R1 as a current detection resistor, the node between the eleventh switching element Q11 and the first resistor R1 is connected to a terminal FB1 of the primary-side control IC 101. Both ends of a primary winding Np2 of a pulse transformer PT are connected to the first pulse signal terminal PS1 and the second pulse signal terminal PS2 of the primary-side control IC 101. The ground terminal GND of the primary-side control IC 101 is connected to a GND line.

Preferably, driving power for the secondary-side control IC 102 may be directly supplied from the output terminal Vout or be supplied from the output terminal Vout via the regulator circuit. Alternatively, another auxiliary winding of the transformer T may be provided, a voltage generated at the auxiliary winding may be rectified and smoothed, and a resultant voltage may be supplied as the driving power for the secondary-side control IC 102. Alternatively, the driving power for the secondary-side control IC 102 may be supplied from the primary-side control circuit via the pulse transformer PT. In order to obtain drive voltages at the driving power supply terminal Vcc, a first driving power supply terminal Vdr3, and a second driving power supply terminal Vdr4 as described above and arranged to control the thirteenth switching element Q13, a control terminal of the thirteenth switching element Q13 and a first drive terminal DR3 of a secondary-side control IC 102 are connected. In order to control the fourteenth switching element Q14, a control terminal of the fourteenth switching element Q14 and a second drive terminal DR4 of the secondary-side control IC 102 are connected. A signal obtained by dividing an output voltage with a fourth resistor R4 and a fifth resistor R5 and a signal output from a ramp wave generation circuit 103 are combined, and a resultant signal is input into a terminal FB2 of the secondary-side control IC 102. The ramp wave generation circuit 103 is preferably used to integrate a voltage across the first inductor L1 and includes a second resistor R2, a third resistor R3, a fourth capacitor C4, and a fifth capacitor C5. Both ends of a secondary winding Ns2 of the pulse transformer PT are connected to a first pulse signal terminal PS3 and a second pulse signal terminal PS4 of the secondary-side control IC 102.

Preferably, by using MOSFETs as the first switching circuit S1 to the fourth switching circuit S4 in the primary-side control IC 101 and a fifth switching circuit S5 to an eighth switching circuit S8 in the secondary-side control IC 102, body diodes of the MOSFETs can be used as the first diode D1 to the fourth diode D4 in the primary-side control IC 101 and a fifth diode D5 to an eighth diode D8 in the secondary-side control IC 102. The eleventh switching element Q11 to the fourteenth switching element Q14 that are preferably power semiconductor elements may not be MOSFETs, and may preferably be bipolar junction transistors (BJTs) or insulated-gate bipolar transistors (IGBTs), for example. Referring to FIG. 3, preferably, only the twelfth switching element Q12 is a p-channel FET, and other switching elements are n-channel FETs. However, the type of an FET used as each switching element may be changed as appropriate.

As will be described in detail below, the primary-side control IC 101 and the secondary-side control IC 102 may preferably have substantially the same hardware configuration.

Figure 4:
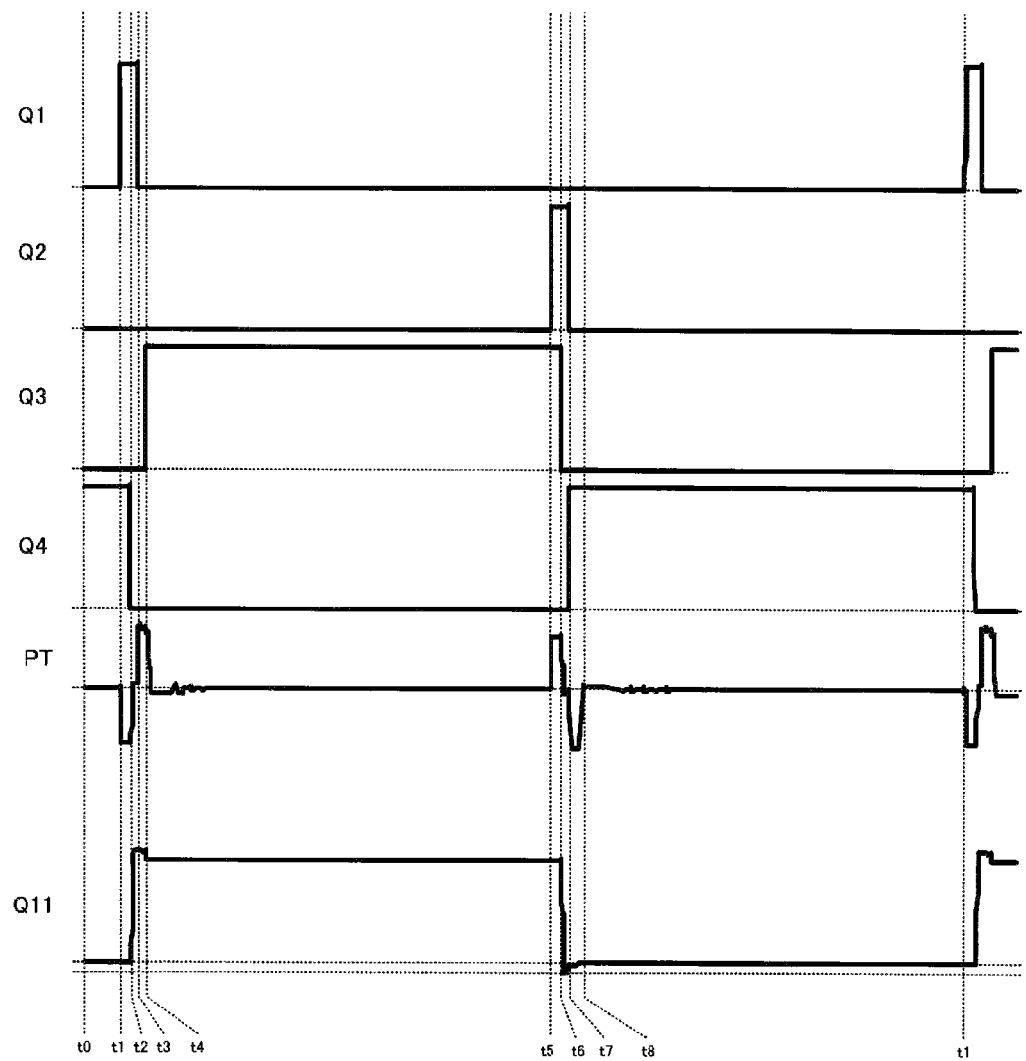
FIG. 4 is a waveform diagram of each unit in a switching power supply apparatus according to the first preferred embodiment of the present invention in a single switching period.

FIG. 4 is a waveform diagram illustrating the changes in gate-to-source voltage at the first switching element Q1 to the fourth switching element Q4, the change in drain-to-source voltage at the eleventh switching element Q11, and the change in voltage across the primary winding Np2 of the pulse transformer PT in a switching period of the eleventh switching element Q11.

The operation of each unit in the switching period of the eleventh switching element Q11 will be described using times t0 to t8.

Operation in Period from Time t0 to Time t1

Figure 5:
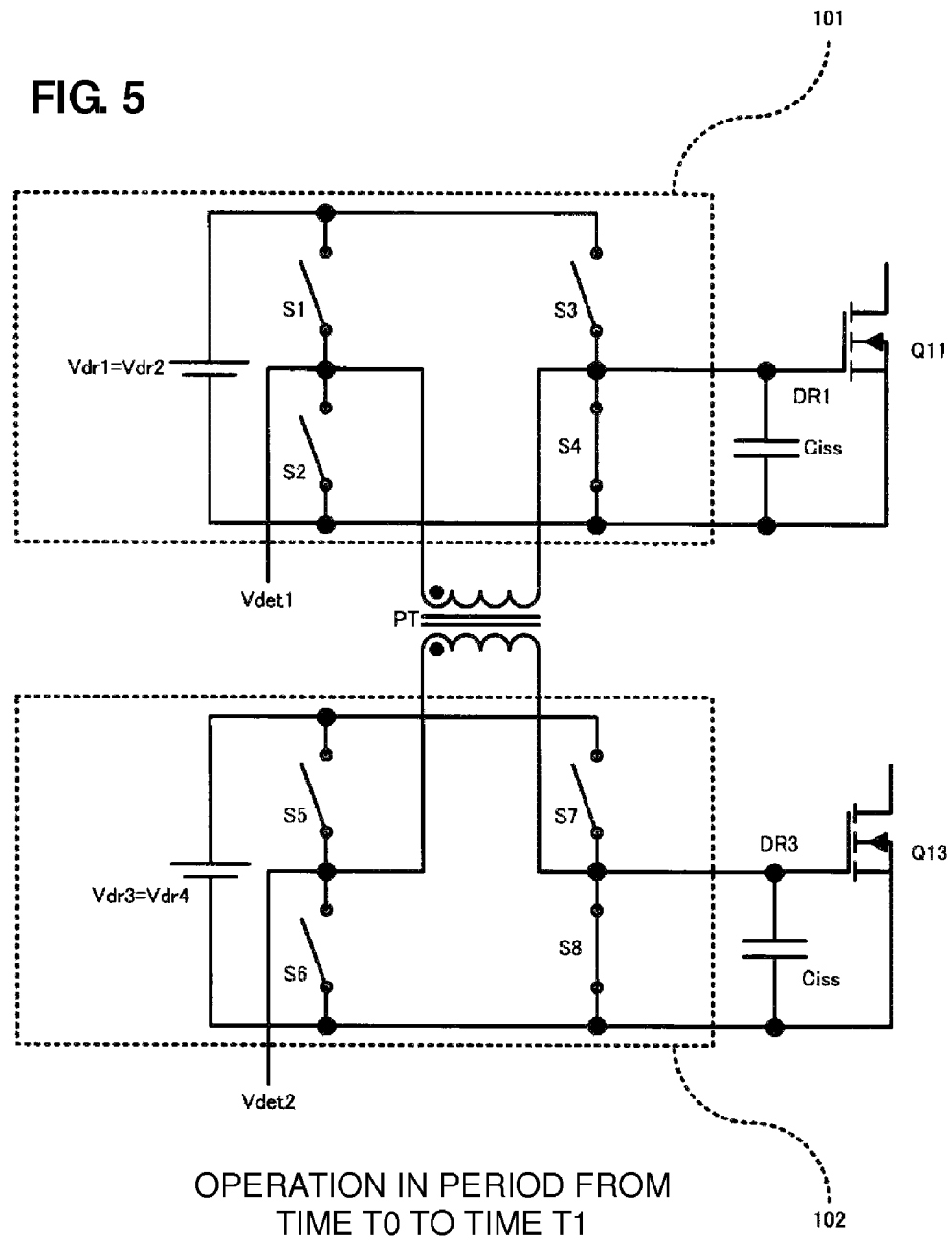
FIG. 5 is a diagram describing the internal operations of control ICs in a period from a time t0 to a time t1.

FIG. 5 is a circuit block diagram describing operations of the primary-side control IC 101 and the secondary-side control IC 102 in the period from time t0 to time t1. For easier understanding of circuit operations, the illustration of the driving power supply terminal Vcc, the driving power supply terminal DRPWR1, the terminal FB1, the second drive terminal DR2, the first comparator COMP1, the digital control unit, the ninth diode D9, and the ninth switching circuit S9, which are illustrated in FIG. 2, is omitted. When it is assumed that the turn ratio between the primary side and the secondary side of the pulse transformer PT is approximately 1, Vdr1≈Vdr2 is satisfied. Accordingly, for simplification of illustration, it is assumed that the first power supply terminal Vdr1 and the second power supply terminal Vdr2 are connected to a common power supply voltage terminal and the first driving power supply terminal Vdr3 and the second driving power supply terminal Vdr4 are connected to a common power supply voltage terminal. The gate terminals of the first switching circuit S1 to the eighth switching circuit S8 are controlled in accordance with a signal output from the digital control unit (not illustrated). The primary-side control IC 101 and the secondary-side control IC 102 preferably have substantially the same hardware configuration.

In this period, the first switching circuit S1, the second switching circuit S2, and the third switching circuit S3 are in an OFF state, and the fourth switching circuit S4 is in an ON state. Since the fourth switching circuit S4 is in the ON state, the gate and the source of the eleventh switching element Q11 connected to the first drive terminal DR1 of the primary-side control IC 101 are short circuited and no electric charge is stored in an input capacitor Ciss included in the eleventh switching element Q11. That is, the eleventh switching element Q11 is in the OFF state.

The twelfth switching element Q12 is a switch of a clamping circuit. Since the twelfth switching element Q12 and the eleventh switching element Q11 perform complementary operations before and after a dead period, the twelfth switching element Q12 is in the ON state.

As in the primary-side control IC 101, in the secondary-side control IC 102, the fifth switching circuit S5, the sixth switching circuit S6, and the seventh switching circuit S7 are in the OFF state and the eighth switching circuit S8 is in the ON state. Since the eighth switching circuit S8 is in the ON state, the gate and the source of the thirteenth switching element Q13 connected to the first drive terminal DR3 of the secondary-side control IC 102 are short circuited and no electric charge is stored in the input capacitor Ciss included in the thirteenth switching element Q13. That is, the thirteenth switching element Q13 that functions as a rectification-side synchronous rectifier is in the OFF state.

Since the fourteenth switching element Q14 that functions as a commutation-side synchronous rectifier and the thirteenth switching element Q13 perform complementary operations before and after a dead period, the fourteenth switching element Q14 is in the ON state.

Operation at Time t1

Figure 6:
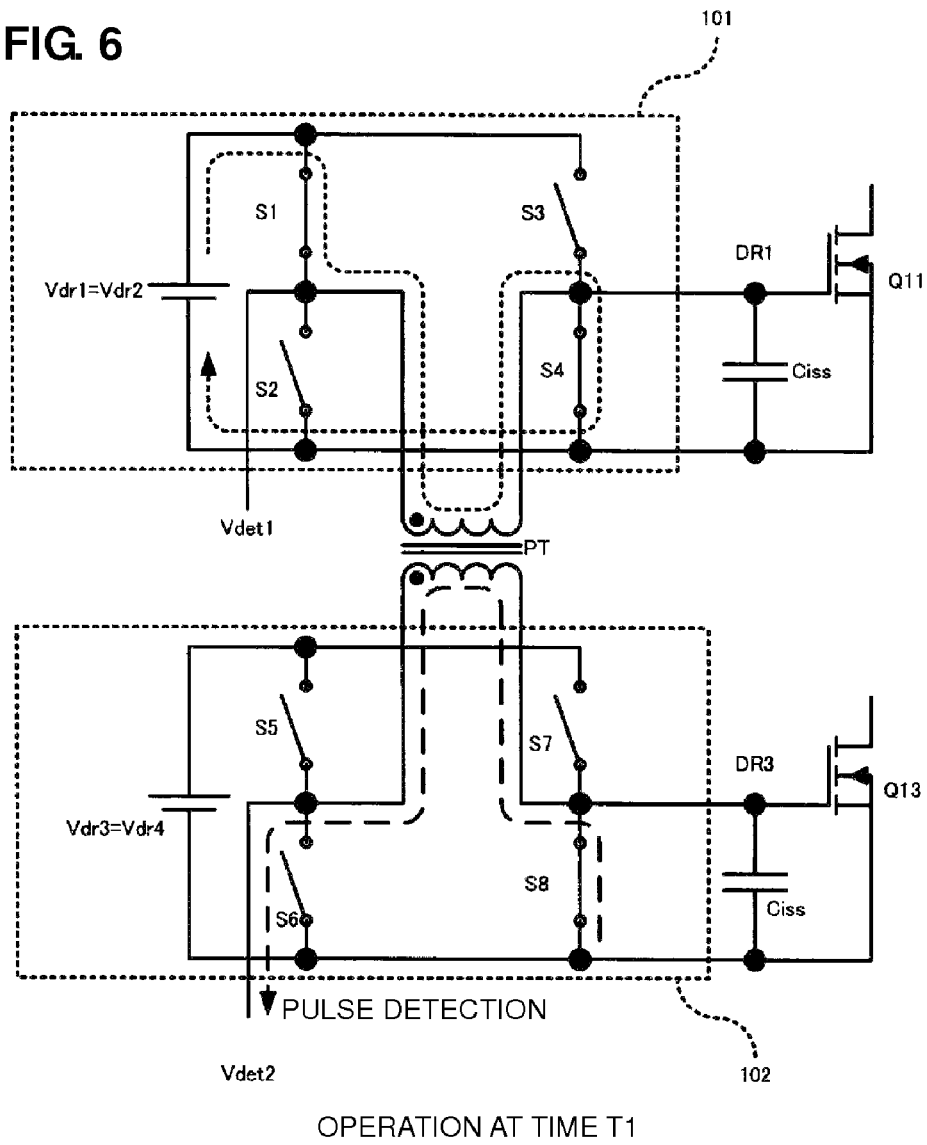
FIG. 6 is a diagram describing the internal operations of the control ICs at the time t1.

FIG. 6 is a circuit block diagram describing operations of the primary-side control IC 101 and the secondary-side control IC 102 at the time t1.

At the time t1, the first switching circuit S1 in the primary-side control IC 101 is turned on. As a result, a current supplied from the first power supply terminal Vdr1 flows via the first switching circuit S1, the primary winding Np2 of the pulse transformer PT, and the fourth switching circuit S4. When the primary winding Np2 of the pulse transformer PT is energized, a voltage is generated at the secondary winding Ns2 of the pulse transformer PT and is detected by a detection terminal Vdet2 that is disposed at the node between the fifth switching circuit S5 and the sixth switching circuit S6.

Operation in Period From Time t1 to Time t2

Figure 7:
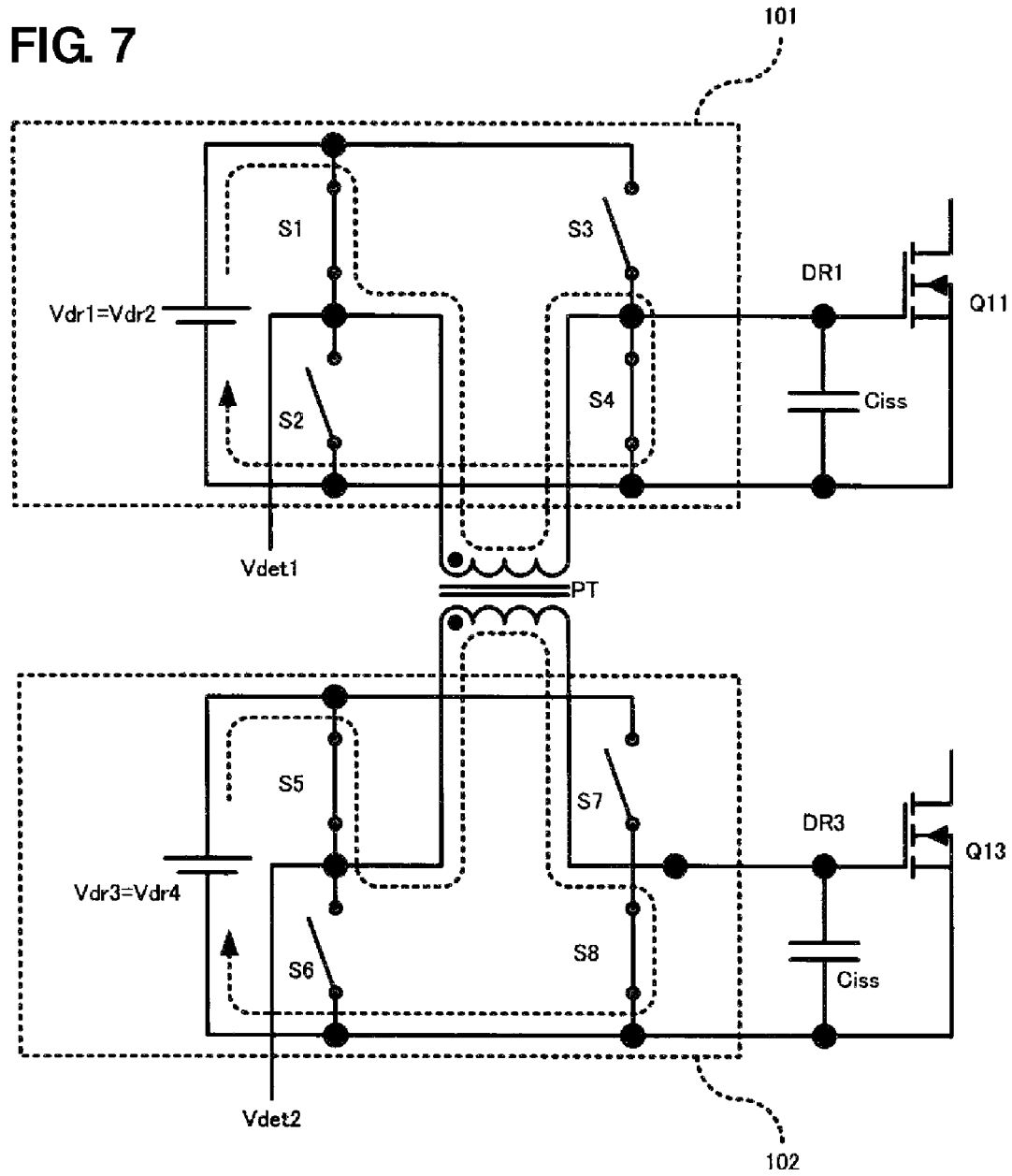
FIG. 7 is a diagram describing the internal operations of the control ICs in a period from the time t1 to a time t2.

FIG. 7 is a circuit block diagram describing operations of the primary-side control IC 101 and the secondary-side control IC 102 in the period from the time t1 to the time t2.

When a voltage is input into the detection terminal Vdet2, the digital control unit in the secondary-side control IC 102 turns on the fifth switching circuit S5. As a result, a current supplied from the second driving power supply terminal Vdr4 of the secondary-side control IC 102 flows via the fifth switching circuit S5, the secondary winding Ns2 of the pulse transformer PT, and the eighth switching circuit S8.

Operation at Time t2

Figure 8:
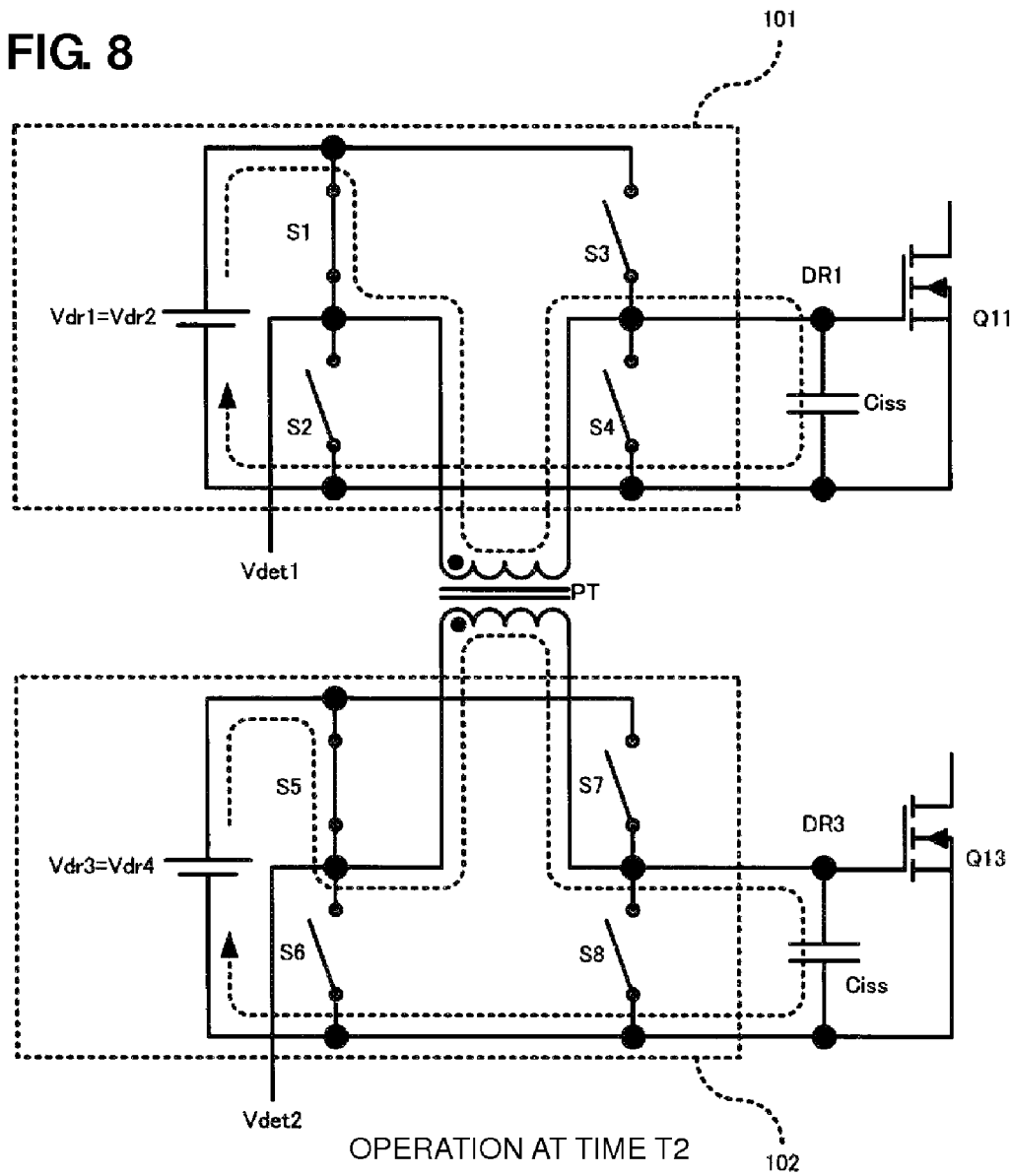
FIG. 8 is a diagram describing the internal operations of the control ICs at the time t2.

FIG. 8 is a circuit block diagram describing operations of the primary-side control IC 101 and the secondary-side control IC 102 at the time t2.

At the time t2, the digital control unit in the primary-side control IC 101 and the digital control unit in the secondary-side control IC 102 turn off the fourth switching circuit S4 and the eighth switching circuit S8, respectively. As a result, a current supplied from the first power supply terminal Vdr1 of the primary-side control IC 101 passes through the input capacitor Ciss in the eleventh switching element Q11, an electric charge is stored in the input capacitor Ciss, and the eleventh switching element Q11 is turned on. At the same time, a current supplied from the second driving power supply terminal Vdr4 of the secondary-side control IC 102 passes through the input capacitor Ciss in the thirteenth switching element Q13, an electric charge is stored in the input capacitor Ciss, and the thirteenth switching element Q13 is turned on.

Operation in Period from Time t2 to Time t3

Figure 9:
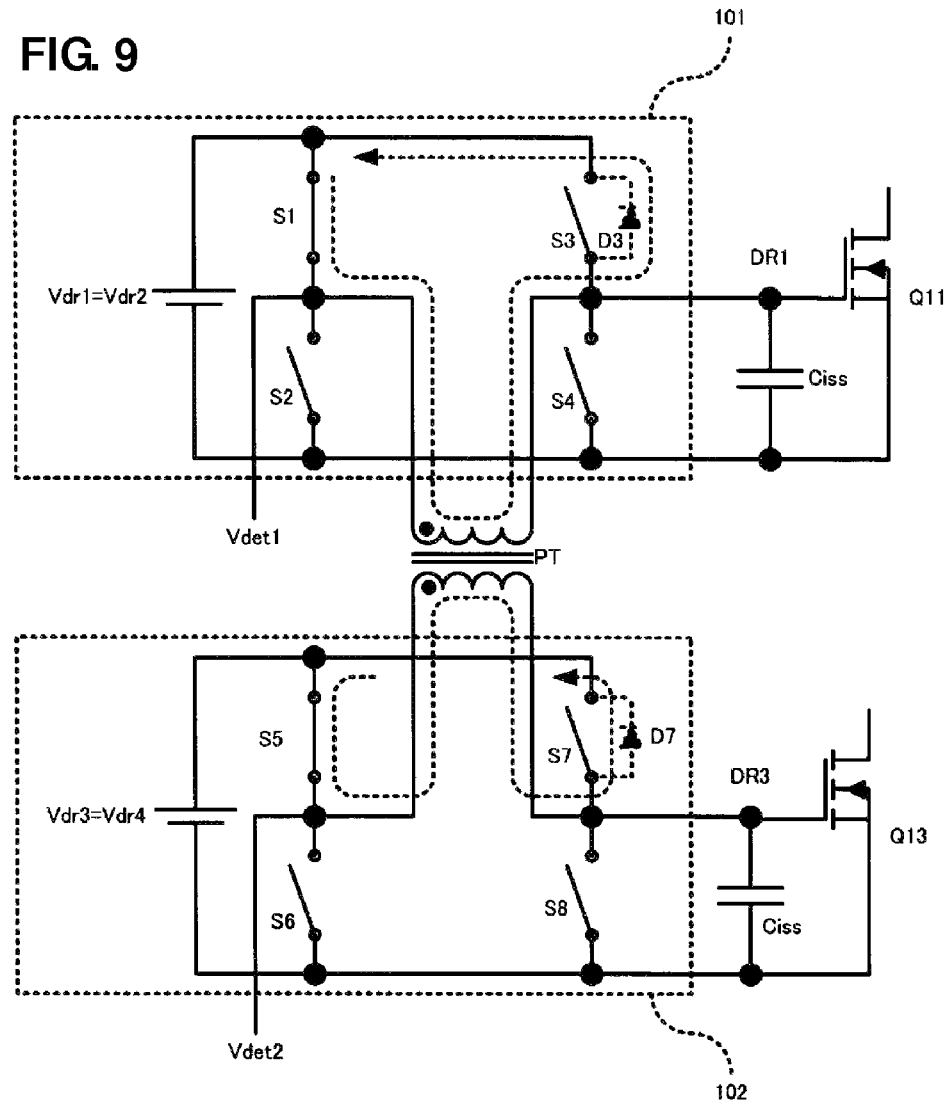
FIG. 9 is a diagram describing the internal operations of the control ICs in a period from the time t2 to a time t3.

FIG. 9 is a circuit block diagram describing operations of the primary-side control IC 101 and the secondary-side control IC 102 in the period from the time t2 to the time t3.

In the period from the time t2 to the time t3, when the gate voltage of the eleventh switching element Q11 reaches the voltage at the first power supply terminal Vdr1 and the second power supply terminal Vdr2 and the gate voltage of the thirteenth switching element Q13 reaches the voltage at the first driving power supply terminal Vdr3 and the second driving power supply terminal Vdr4, the current that has been supplied from the first power supply terminal Vdr1 of the primary-side control IC 101 reflows to the first power supply terminal Vdr1 via the first switching element Q1, the primary winding Np2 of the pulse transformer PT, and the third diode D3. In addition, the current that has been supplied from the second driving power supply terminal Vdr4 of the secondary-side control IC 102 reflows to the second driving power supply terminal Vdr4 via the fifth switching circuit S5, the secondary winding Ns2 of the pulse transformer PT, and a seventh diode D7.

Operation in Period from Time t3 to Time t4

Figure 10:
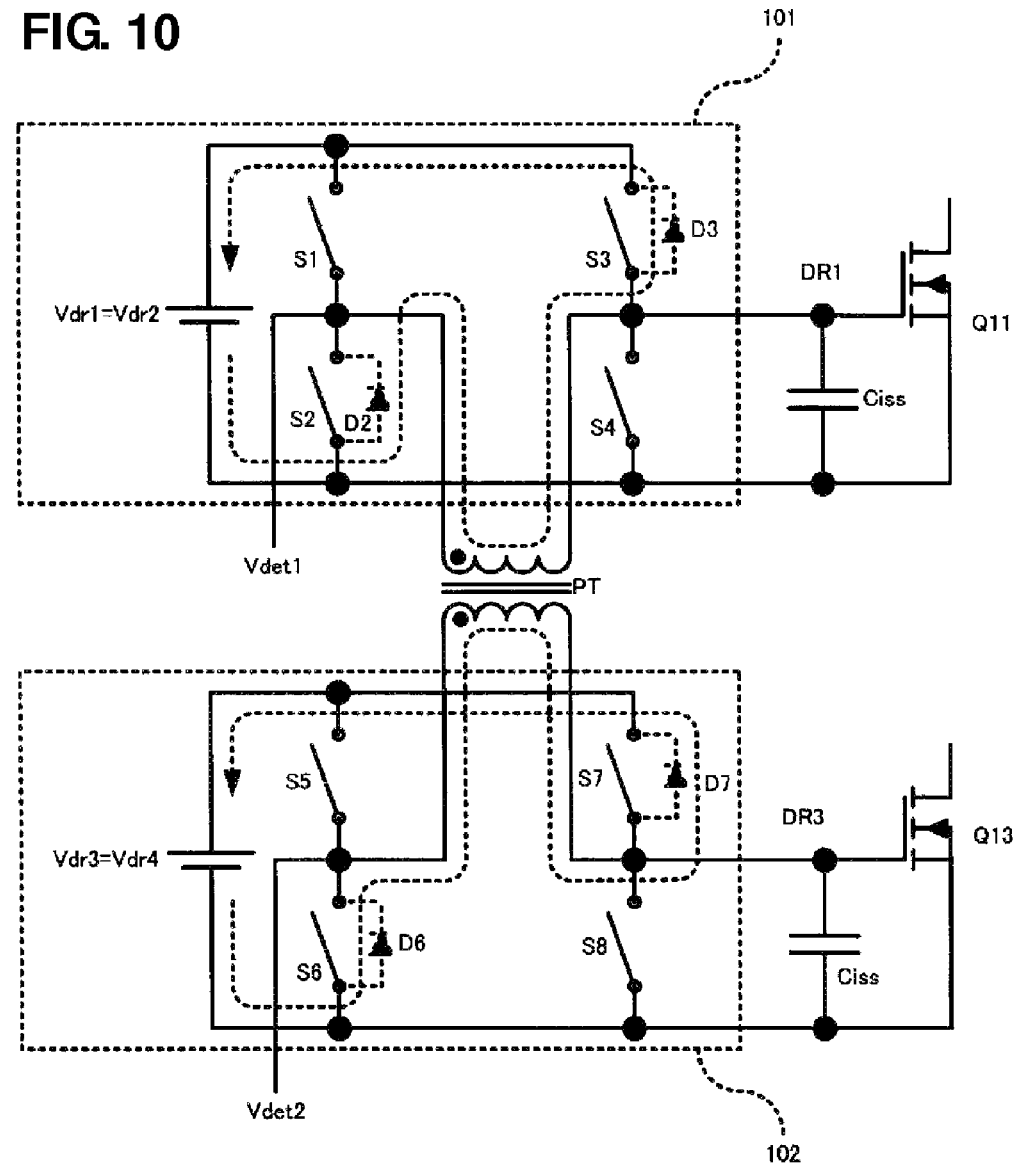
FIG. 10 is a diagram describing the internal operations of the control ICs in a period from the time t3 to a time t4.

FIG. 10 is a circuit block diagram describing operations of the primary-side control IC 101 and the secondary-side control IC 102 in the period from the time t3 to the time t4.

At the time t3, when the first switching circuit S1 in the primary-side control IC 101 and the fifth switching circuit S5 in the secondary-side control IC 102 are turned off, electromagnetic energy stored in the pulse transformer PT is regenerated. When it is assumed that the turn ratio between the primary side and the secondary side of the pulse transformer PT is approximately 1, for example, the electromagnetic energy is regenerated to a node between the first power supply terminal Vdr1 and the second power supply terminal Vdr2 or to a node between the first driving power supply terminal Vdr3 and the second driving power supply terminal Vdr4 having a lower voltage. In the first preferred embodiment, since a circuit arranged to directly supply power to the first driving power supply terminal Vdr3 and the second driving power supply terminal Vdr4 is not disposed on the secondary side, the voltage at the first driving power supply terminal Vdr3 and the second driving power supply terminal Vdr4 is slightly lower than that at the first power supply terminal Vdr1 and the second power supply terminal Vdr2. Accordingly, the electromagnetic energy is regenerated to the secondary-side control circuit. In the period from the time t3 to the time t4, a current flows via a sixth diode D6, the secondary winding Ns2 of the timing signal transmission transformer PT, and the seventh diode D7 while decreasing at the secondary winding Ns2 in the secondary-side control IC 102. Electromagnetic energy stored in the timing signal transmission transformer PT is regenerated to the first driving power supply terminal Vdr3 and the second driving power supply terminal Vdr4.

Operation in Period from Time t4 to Time t5

Figure 11:
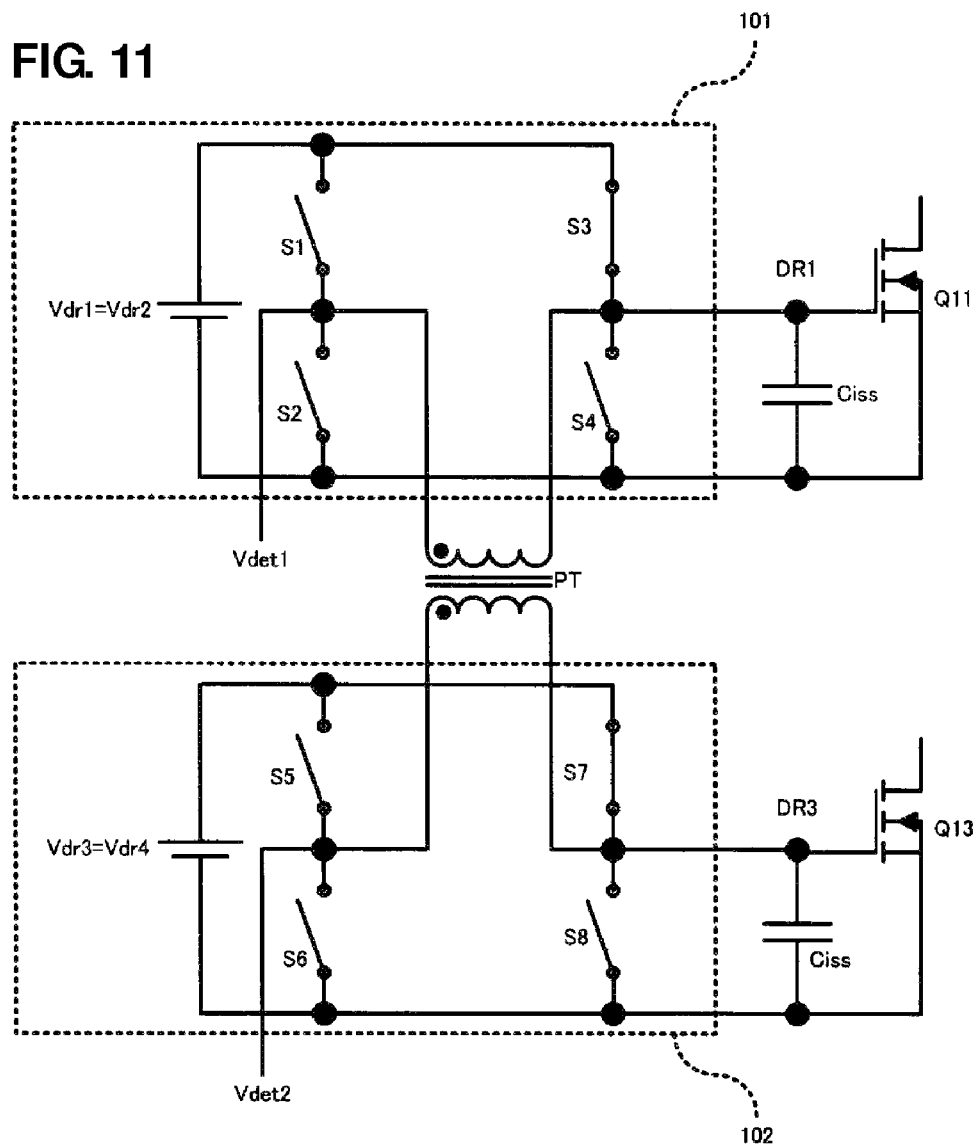
FIG. 11 is a diagram describing the internal operations of the control ICs in a period from the time t4 to a time t5.

FIG. 11 is a circuit block diagram describing operations of the primary-side control IC 101 and the secondary-side control IC 102 in the period from the time t4 to the time t5.

At the time t4, the current passing through the secondary winding Ns2 of the pulse transformer PT becomes close to zero, and no forward current passes through the sixth diode D6 and the seventh diode D7 in the secondary-side control IC 102. Subsequently, the third switching circuit S3 in the primary-side control IC 101 and the seventh switching circuit S7 in the secondary-side control IC 102 are turned on. As a result, the gate potential of the eleventh switching element Q11 is maintained at a voltage at the first power supply terminal Vdr1 or the second power supply terminal Vdr2, and the gate potential of the thirteenth switching element Q13 is maintained at a voltage at the first driving power supply terminal Vdr3 or the second driving power supply terminal Vdr4. That is, the eleventh switching element Q11 and the thirteenth switching element Q13 are maintained in the ON state.

Operation at Time t5

Figure 12:
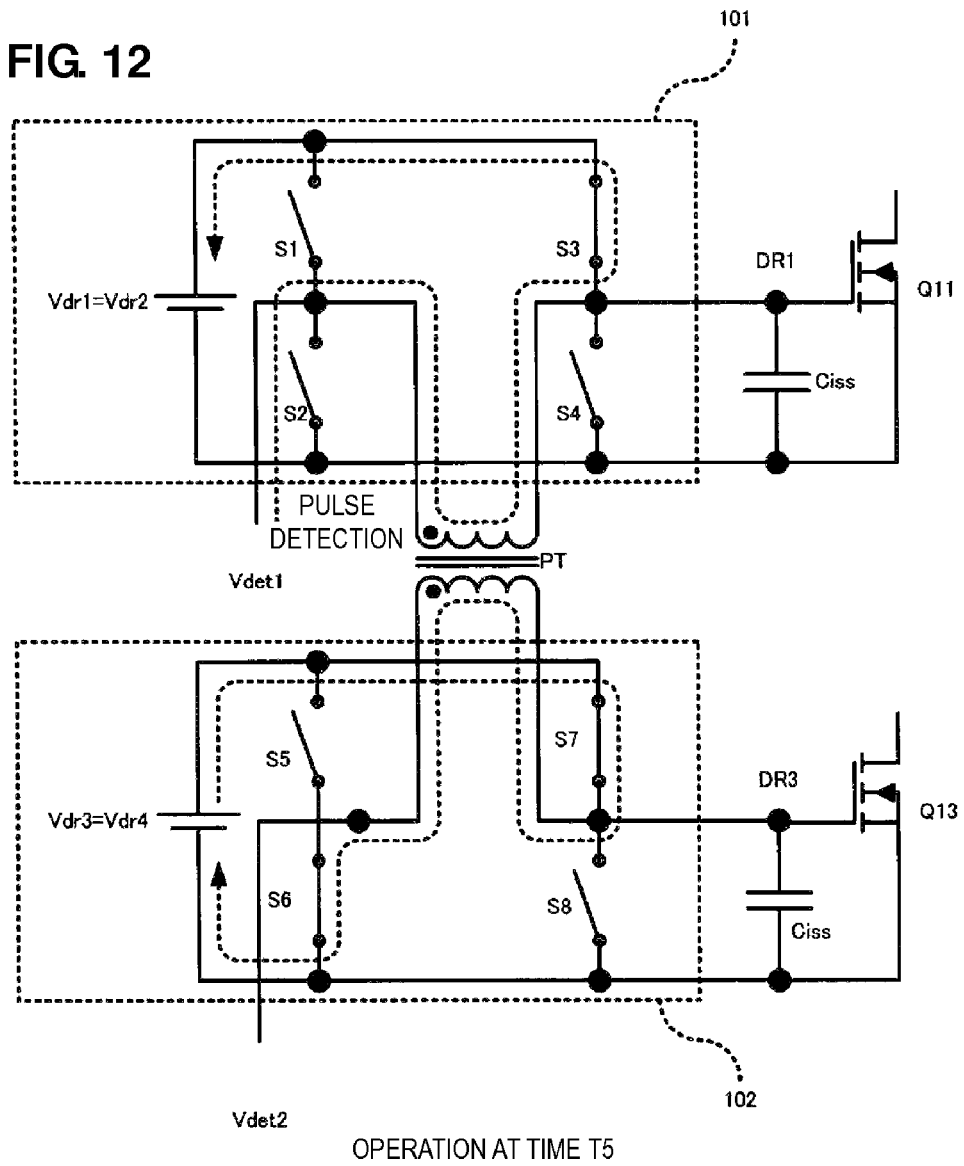
FIG. 12 is a diagram describing the internal operations of the control ICs at the time t5.

FIG. 12 is a circuit block diagram describing operations of the primary-side control IC 101 and the secondary-side control IC 102 at the time t5.

At the time t5, the sixth switching circuit S6 in the secondary-side control IC 102 is turned on. As a result, a current supplied from the first driving power supply terminal Vdr3 flows via the seventh switching circuit S7, the secondary winding Ns2 of the pulse transformer PT, and the sixth switching circuit S6. When the secondary winding Ns2 of the pulse transformer PT is energized, a voltage is generated at the primary winding Np2 of the pulse transformer PT and is detected by the detection terminal Vdet1 disposed at the node between the first switching circuit S1 and the second switching circuit S2 in the primary-side control IC 101. Thus, a timing signal is transmitted from the secondary side to the primary side.

Operation in Period from Time t5 to Time t6

Figure 13:
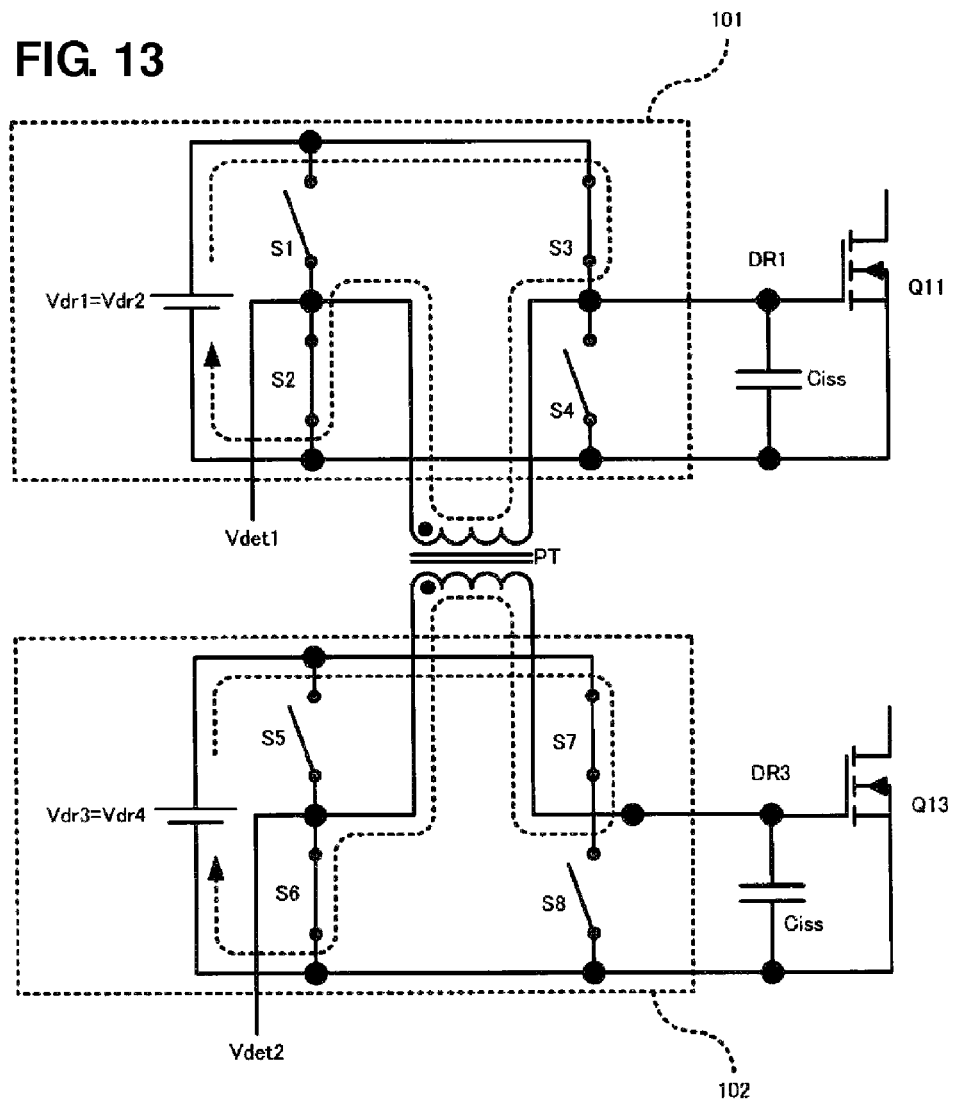
FIG. 13 is a diagram describing the internal operations of the control ICs in a period from the time t5 to a time t6.

FIG. 13 is a circuit block diagram describing operations of the primary-side control IC 101 and the secondary-side control IC 102 in the period from the time t5 to the time t6.

When a voltage is input into the detection terminal Vdet1, the digital control unit in the primary-side control IC 101 turns on the second switching circuit S2. As a result, a current supplied from the second power supply terminal Vdr2 of the primary-side control IC 101 flows via the third switching circuit S3, the primary winding Np2 of the pulse transformer PT, and the second switching circuit S2.

Operation at Time t6

Figure 14:
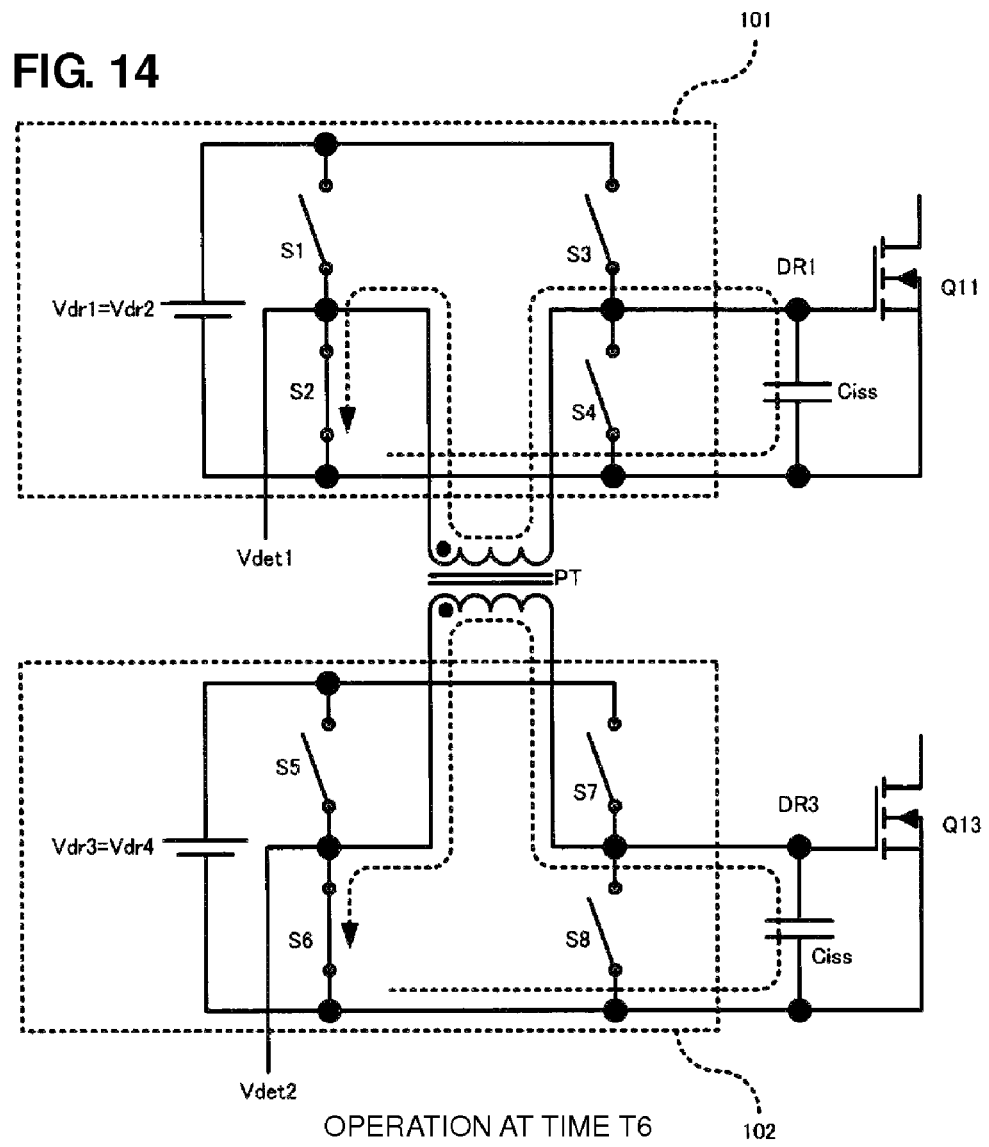
FIG. 14 is a diagram describing the internal operations of the control ICs at the time t6.

FIG. 14 is a circuit block diagram describing operations of the primary-side control IC 101 and the secondary-side control IC 102 at the time t6. At the time t6, the digital control unit in the primary-side control IC 101 and the digital control unit in the secondary-side control IC 102 turn off the third switching circuit S3 and the seventh switching circuit S7, respectively. As a result, an electric charge stored in the input capacitor Ciss in the eleventh switching element Q11 is discharged, and the eleventh switching element Q11 is turned off. At the same time, an electric charge stored in the input capacitor Ciss in the thirteenth switching element Q13 is discharged, and the thirteenth switching element Q13 is turned off.

Operation in Period from Time t6 to Time t7

Figure 15:
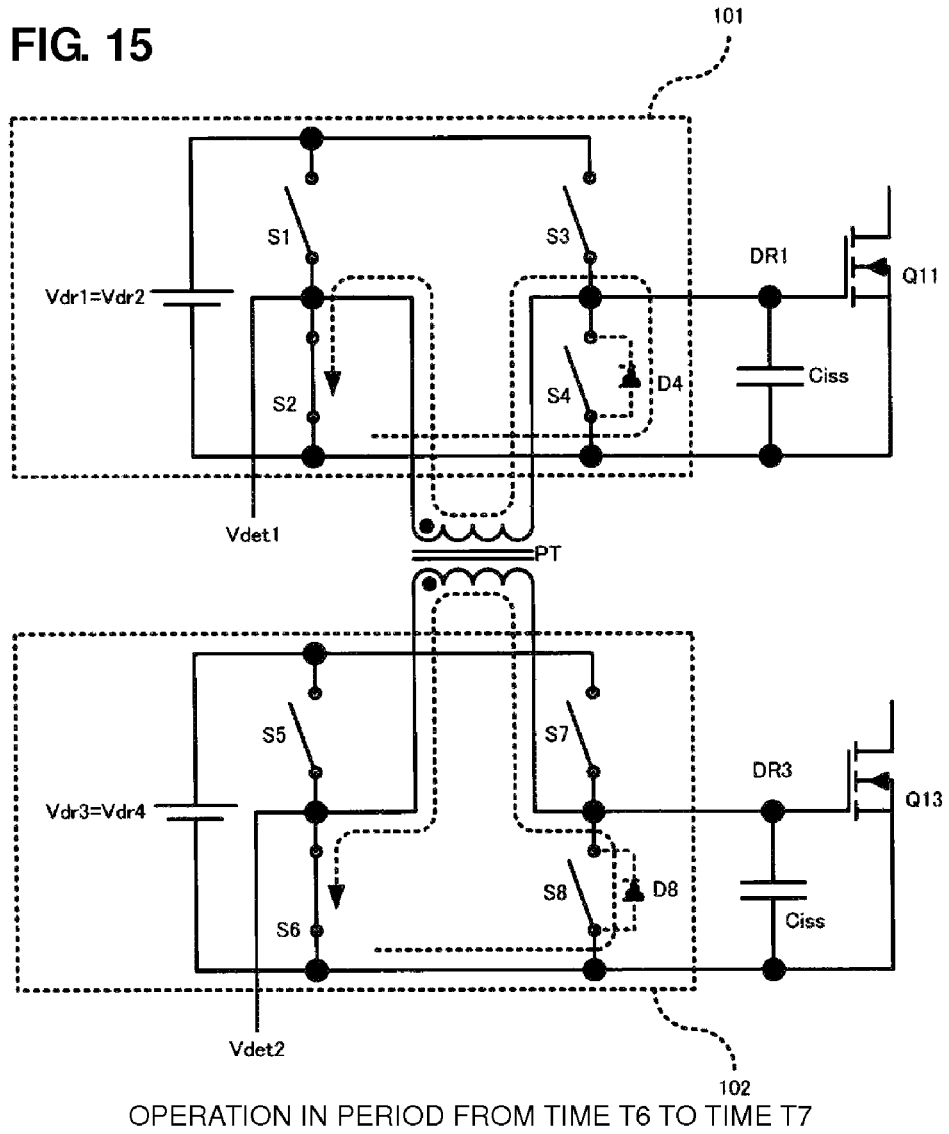
FIG. 15 is a diagram describing the internal operations of the control ICs in a period from the time t6 to a time t7.

FIG. 15 is a circuit block diagram describing operations of the primary-side control IC 101 and the secondary-side control IC 102 in the period from the time t6 to the time t7.

In the period from the time t6 to the time t7, when the gate-to-source voltages of the eleventh switching element Q11 and the thirteenth switching element Q13 reach approximately 0 V, a current flows to the ground terminal GND of the primary-side control IC 101 via the fourth diode D4, the primary winding Np2 of the pulse transformer PT, and the second switching circuit S2 and a current flows to the ground terminal GND of the secondary-side control IC 102 via the eighth diode D8, the secondary winding Ns2 of the pulse transformer PT, and the sixth switching circuit S6.

Operation in Period from Time t7 to Time t8

Figure 16:
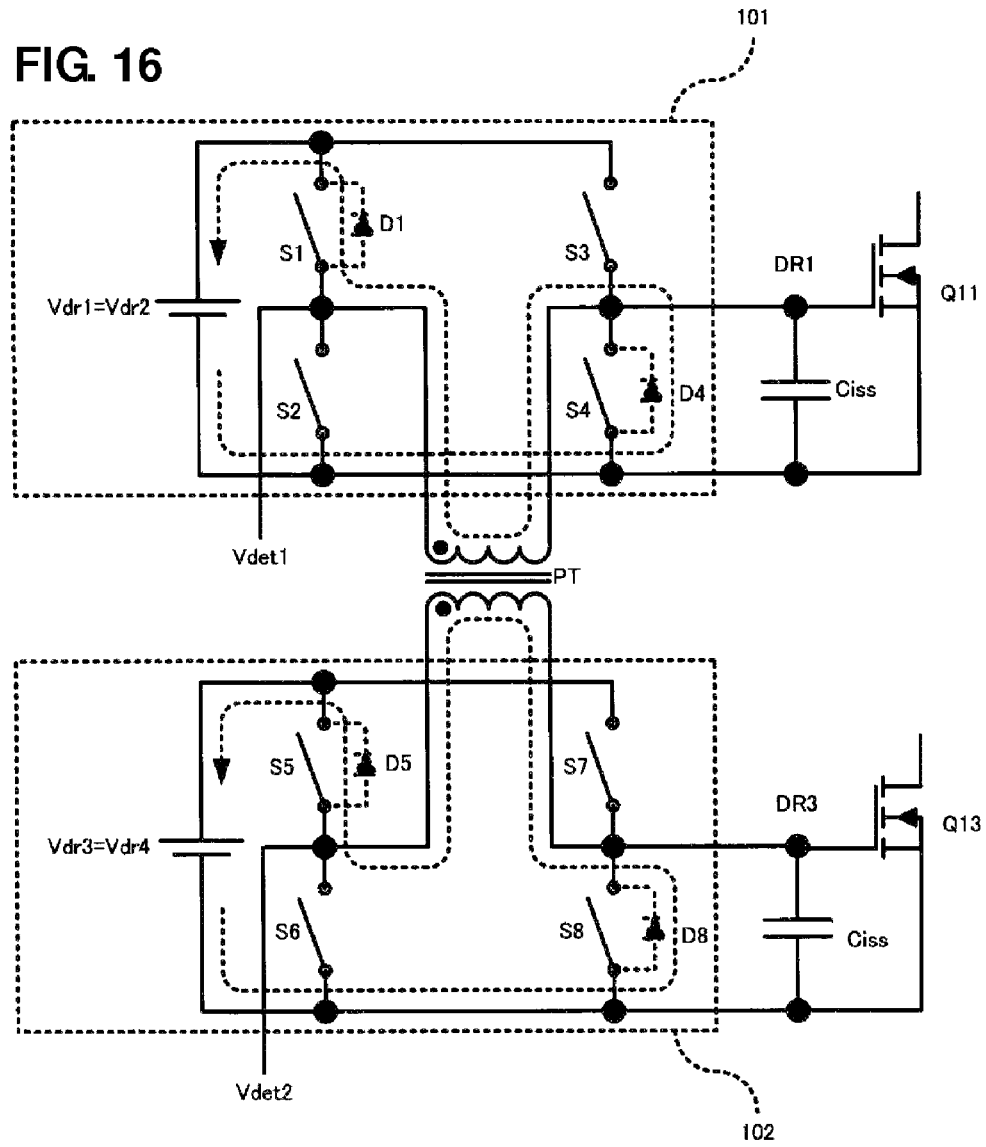
FIG. 16 is a diagram describing the internal operations of the control ICs in a period from the time t7 to a time t8.

FIG. 16 is a circuit block diagram describing operations of the primary-side control IC 101 and the secondary-side control IC 102 in the period from the time t7 to the time t8.

At the time t7, the fourth switching circuit S4 in the primary-side control IC 101 and the eighth switching circuit S8 in the secondary-side control IC 102 are turned on and the second switching circuit S2 in the primary-side control IC 101 and the sixth switching circuit S6 in the secondary-side control IC 102 are turned off. As a result, electromagnetic energy stored in the pulse transformer PT is regenerated. When it is assumed that the turn ratio between the primary side and the secondary side of the pulse transformer PT is approximately 1, the electromagnetic energy is regenerated to the node between the first power supply terminal Vdr1 and the second power supply terminal Vdr2 or the node between the first driving power supply terminal Vdr3 and the second driving power supply terminal Vdr4 having a lower voltage. In the first preferred embodiment, since a circuit arranged to directly supply power to the first driving power supply terminal Vdr3 and the second driving power supply terminal Vdr4 is not disposed on the secondary side, the voltage at the first driving power supply terminal Vdr3 and the second driving power supply terminal Vdr4 is slightly lower than that at the first power supply terminal Vdr1 and the second power supply terminal Vdr2. Accordingly, the electromagnetic energy is regenerated to the secondary-side circuit. In the period from the time t7 to the time t8, a current flows via the eighth diode D8, the secondary winding Ns2 of the pulse transformer PT, and the fifth diode D5 while decreasing at the secondary winding Ns2 in the secondary-side control IC 102. Electromagnetic energy stored in the pulse transformer PT is regenerated to the first driving power supply terminal Vdr3 and the second driving power supply terminal Vdr4.

Operation after Time t8

An operation in a period from the time t8 to the time t1 is substantially the same as that in the period from the time t0 to the time t1.

In the above-described operations, a signal indicating a time immediately before the eleventh switching element Q11, which is a primary-side main switch, is turned on is output from the primary-side control IC and is transmitted from the primary side to the secondary side or from the secondary side to the primary side via the timing signal transmission transformer PT. The eleventh switching element Q11 and the thirteenth switching element Q13 that is preferably a rectification-side synchronous rectifier are turned on in synchronization with each other, and the fourteenth switching element Q14 that is preferably a commutation-side synchronous rectifier is turned off immediately before the eleventh switching element Q11 is turned on. Since the commutation-side synchronous rectifier is turned off immediately before the main switch is turned on, the generation of a flow-through current which is produced by the simultaneous activation of the main switch and the commutation-side synchronous rectifier is effectively prevented. A signal indicating a time immediately before the rectification-side synchronous rectifier is turned off or a signal indicating a time immediately before the main switch is turned off is transmitted from the primary side to the secondary side or from the secondary side to the primary side via the pulse transformer PT, the main switch on the primary side and the rectification-side synchronous rectifier are turned off in synchronization with each other, and the commutation-side synchronous rectifier is turned on immediately after the main switch has been turned off. In the first preferred embodiment, as illustrated in FIGS. 5 to 16, both a signal indicating a time immediately before the main switch is turned on and a signal indicating a time immediately before the main switch is turned off are preferably transmitted from the primary side to the secondary side. However, these signals may be transmitted from the secondary side to the primary side. A signal that has been transmitted earlier from the primary side or the secondary side is preferentially processed. That is, bidirectional communication can be achieved with a single pulse transformer PT. For example, when the fifth switching circuit S5 in the secondary-side control IC 102 is turned on before the first switching circuit S1 in the primary-side control IC 101 is turned on, the relationship between the primary-side control IC 101 and the secondary-side control IC 102 illustrated in FIG. 6 is reversed. When the sixth switching circuit S6 in the secondary-side control IC 102 is turned on before the second switching circuit S2 in the primary-side control IC 101 is turned on, the relationship between the primary-side control IC 101 and the secondary-side control IC 102 illustrated in FIG. 12 is reversed.

In the above-described operations, in the period from the time t3 to the time t4 illustrated in FIG. 10 and the period from the time t7 to the time t8 illustrated in FIG. 16, electromagnetic energy stored in the pulse transformer PT is regenerated and circuit efficiency is therefore improved. However, at the same time, bidirectional communication cannot be performed during regeneration. In order to prevent this problem, a period in which bidirectional communication can be performed may preferably be extended by performing substantially the same operation in the period from the time t3 to the time t4 and the period from the time t4 to the time t5, performing substantially the same operation in the period from the time t7 to the time t8 and the period from the time t0 to the time t1, and setting a reflow mode instead of a regeneration mode in the period from the time t3 to the time t4 and the period from the time t7 to the time t8. In this case, although circuit efficiency is slightly deteriorated, a problem that the bidirectional communication between the primary side and the secondary side cannot be performed when the switching frequency of the eleventh switching element Q11 is high and the duty ratio of the eleventh switching element Q11 is very low or high is prevented.

Since the primary-side control IC 101 and the secondary-side control IC 102 can preferably separately control a time at which a switching element is driven, it is possible to freely set one of the primary-side control IC 101 and the secondary-side control IC 102 as a control IC to generate and transmit a turn-on signal and a turn-off signal earlier as described in the first preferred embodiment.

Figure 17:
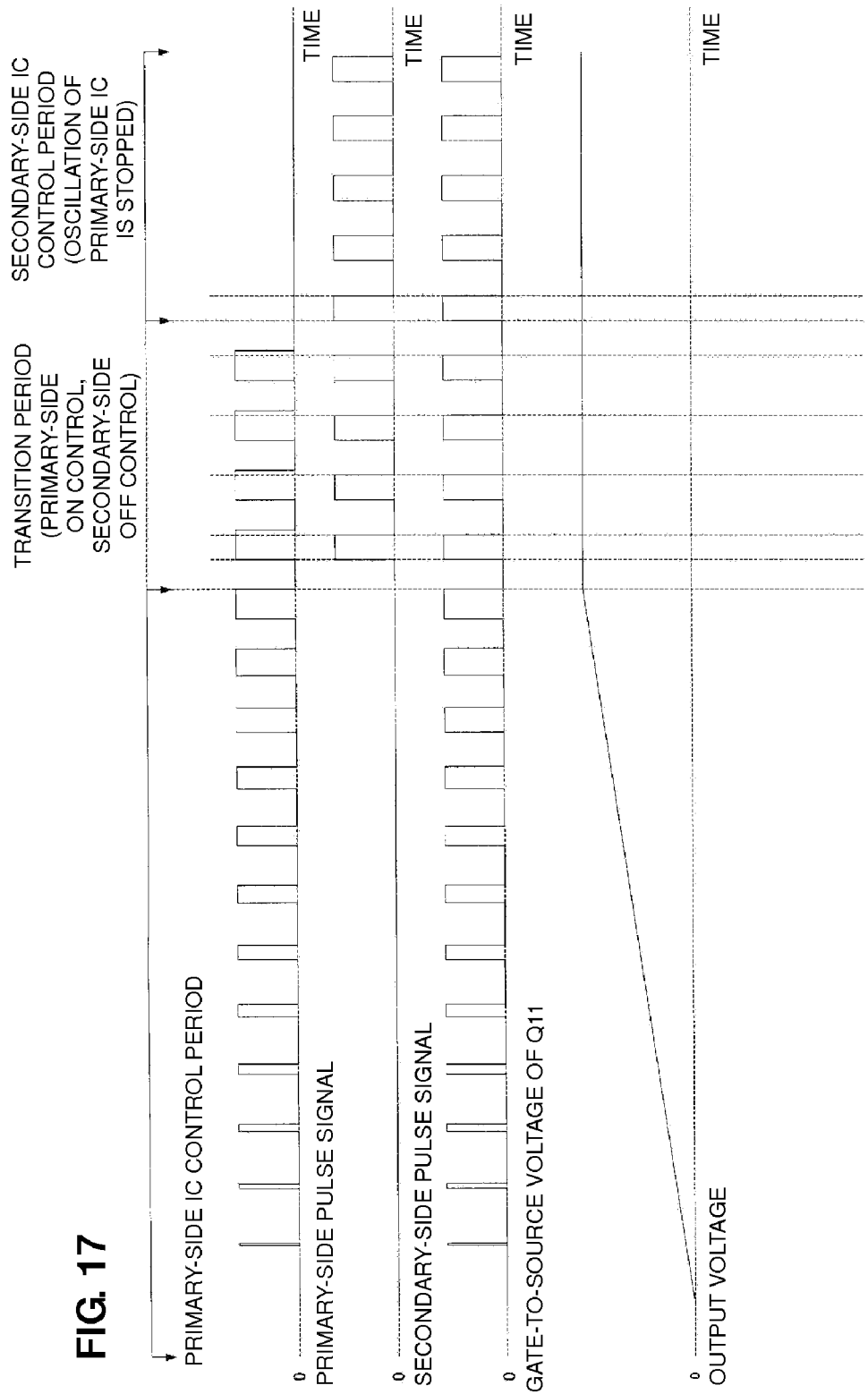
FIG. 17 is a waveform diagram describing operations in a switching power supply apparatus according to the first preferred embodiment of the present invention at the time of soft start.

For example, FIG. 17 is a waveform diagram describing operations at the time of activation of the circuit illustrated in FIG. 3. The waveform of a pulse signal output from the primary-side control IC 101, the waveform of a pulse signal output from the secondary-side control IC 102, the waveform of the gate-to-source voltage of the eleventh switching element Q11, and the waveform of an output voltage at the output terminal Vout are illustrated in this order from the top of FIG. 17.

When an operational mode in which a pre-bias is not supplied to the secondary-side control IC 102 is set in an isolated switching power supply apparatus, no drive voltage is supplied to the secondary-side control IC 102 and only the primary-side control IC 101 is driven at the time of activation of the isolated switching power supply apparatus. That is, the eleventh switching element Q11 and the twelfth switching element Q12 are turned on and off in response to instructions transmitted from the primary-side control IC 101, and the thirteenth switching element Q13 and the fourteenth switching element Q14 to which no driving power is supplied function as diodes including parasitic diodes (the primary-side IC control period illustrated in FIG. 17). Subsequently, each switching circuit in the primary-side control IC 101 performs a switching operation, power is supplied to the secondary side via the pulse transformer PT, and each switching circuit in the secondary-side control IC 102 begins to be driven. When an output voltage reaches a control target value, a function of feeding back the output voltage from the secondary side to the primary side begins. As a result, the secondary-side control IC 102 can effectively determine a time at which the eleventh switching element Q11 is turned off (the transition period illustrated in FIG. 17). After the transition to a steady state, the secondary-side control IC 102 may preferably also determine a time at which each of the eleventh switching element Q11 and the twelfth switching element Q12 is turned on and a time at which each of the eleventh switching element Q11 and the twelfth switching element Q12 is turned off (the secondary-side IC control period illustrated in FIG. 17). In this case, in order to change the location of the authority to determine a time at which the eleventh switching element Q11 is turned on and a time at which the eleventh switching element Q11 is turned off from the primary-side control IC 101 to the secondary-side control IC 102, the secondary-side control IC 102 needs to transmit a timing signal to the gate terminal of the eleventh switching element Q11 earlier than the primary-side control IC 101 since a higher priority is assigned to the digital control unit in the primary-side control IC 101 or the secondary-side control IC 102 which has generated a switching element driving signal earlier. For example, in a soft start operation at the time of activation, by gradually delaying the output of a turn-off instruction signal from the digital control unit in the primary-side control IC 101, the secondary-side control IC 102 transmits a turn-off instruction signal to the eleventh switching element Q11 earlier than the primary-side control IC 101 when the output voltage reaches a target value. Accordingly, the location of the authority to determine a time at which the eleventh switching element Q11 is turned off is changed from the primary-side control IC 101 to the secondary-side control IC 102. In order to change the location of the authority to determine a time at which the eleventh switching element Q11 is turned on from the primary side to the secondary side, a secondary-side oscillation frequency is preferably set to be greater than a primary-side oscillation frequency. As a result, when the secondary-side control IC 102 starts to be operated, the secondary side transmits a signal earlier than the primary side and the location of the authority to determine a time at which the eleventh switching element Q11 is turned on is changed from the primary side to the secondary side. A similar effect can also be obtained by gradually reducing the oscillation frequency of the primary-side control IC 101 after the soft start. In this case, a control signal output from the primary-side control IC 101 is preferentially processed at the time of activation, and a control signal output from the secondary-side control IC 102 is more preferentially processed as the steady state is approached.

Software programming may preferably be performed so that each switching element is controlled in accordance with a control signal from the primary-side control IC 101 for a predetermined period after activation and is controlled in accordance with a control signal from the secondary-side control IC 102 after the predetermined period has elapsed from the activation.

Figure 18:
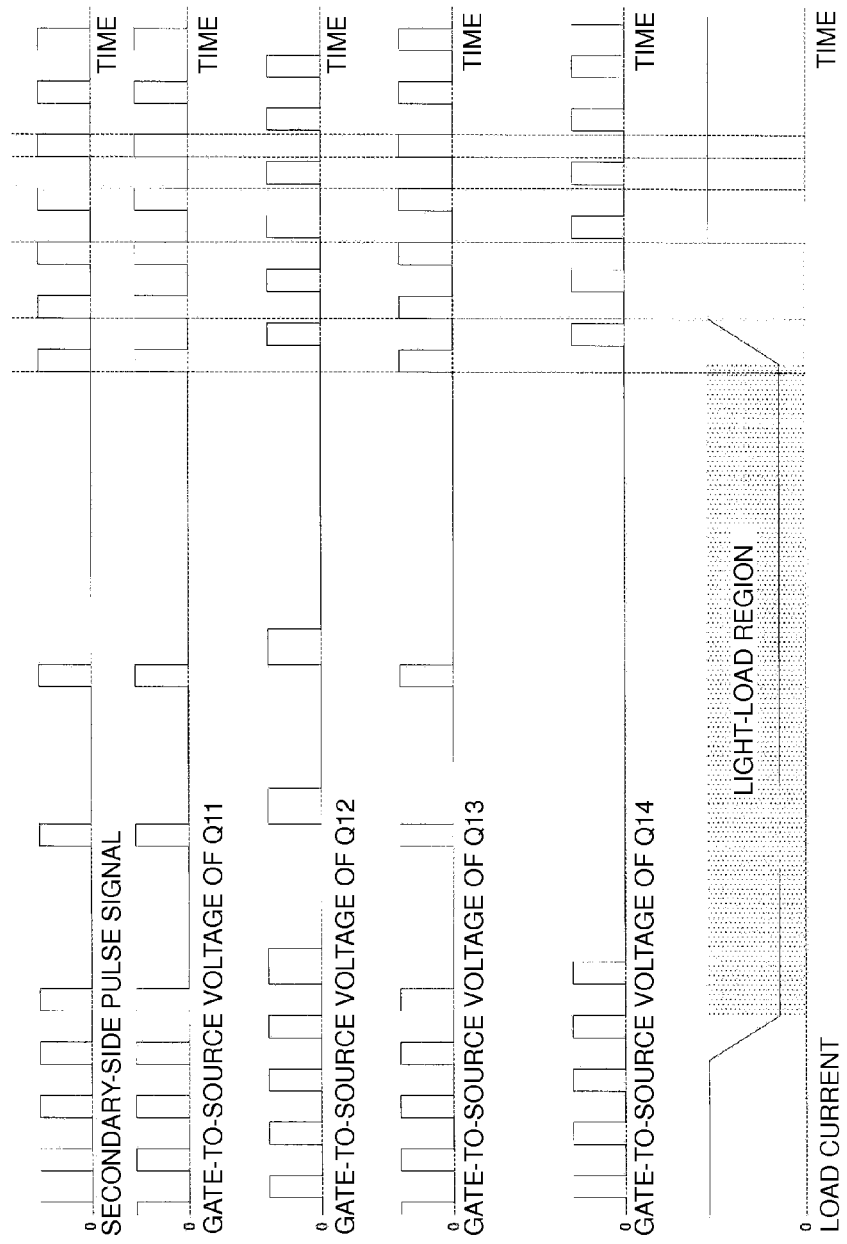
FIG. 18 is a waveform diagram describing operations in a switching power supply apparatus according to the first preferred embodiment of the present invention in a sleep mode.

Even if a current detection element, such as a resistor or a current transformer, for example, is not included in a primary-side circuit, it is possible to use voltage drops detected at the first inductor L1 and the synchronous rectifier on the secondary side as an overcurrent protection function and control processing in a sleep mode under light-load conditions. That is, when the value of an output current detected using a voltage drop at a secondary-side power component is substantially equal to less than a predetermined value, a switching frequency can be reduced by delaying the transmission of an instruction signal for turning on the eleventh switching element Q11. This leads to the reduction in a switching fixed loss and the increase in efficiency under light-load conditions. FIG. 18 is a waveform diagram describing operations in the sleep mode. The waveform of a pulse signal output from the secondary-side control IC 102, the waveforms of the gate-to-source voltages of the eleventh switching element Q11, the twelfth switching element Q12, the thirteenth switching element Q13, and the fourteenth switching element Q14, and the waveform of a load current passing through the output terminal Vout are illustrated in this order from the top of FIG. 18.

By detecting the reduction in the output current, it can be determined whether a light-load condition in which, for example, an electronic apparatus is in a standby state is set. When it is detected that the output current has been reduced to a value substantially equal to or less than a predetermined value, a turn-on instruction signal output from the secondary-side control IC 102 is preferably intermittently oscillated. In this case, the authority to determine a time at which the eleventh switching element Q11 is turned on and a time at which the eleventh switching element Q11 is turned off is given to the secondary-side control IC 102 so that a control signal is not output from the primary-side control IC 101. As a result, preferably, the switching frequency of the eleventh switching element Q11 under light-load conditions is reduced, a switching fixed loss is reduced, and efficiency is increased (a sleep mode). When the recovery from the standby state occurs in the electronic apparatus and the light-load condition is cleared, a load current is increased. By detecting the increase in the load current and returning a control signal output from the secondary-side control IC to a normal condition, the sleep mode can be exited.

In contrast to the above-described situation, when a current detection resistor or a current transformer, for example, is disposed on the primary side and an output current can be indirectly detected on the primary side, the primary-side IC outputs a turn-on instruction signal under light-load conditions. As a result, a sleep mode operation to reduce a switching frequency under light-load conditions is achieved.

Figure 19:
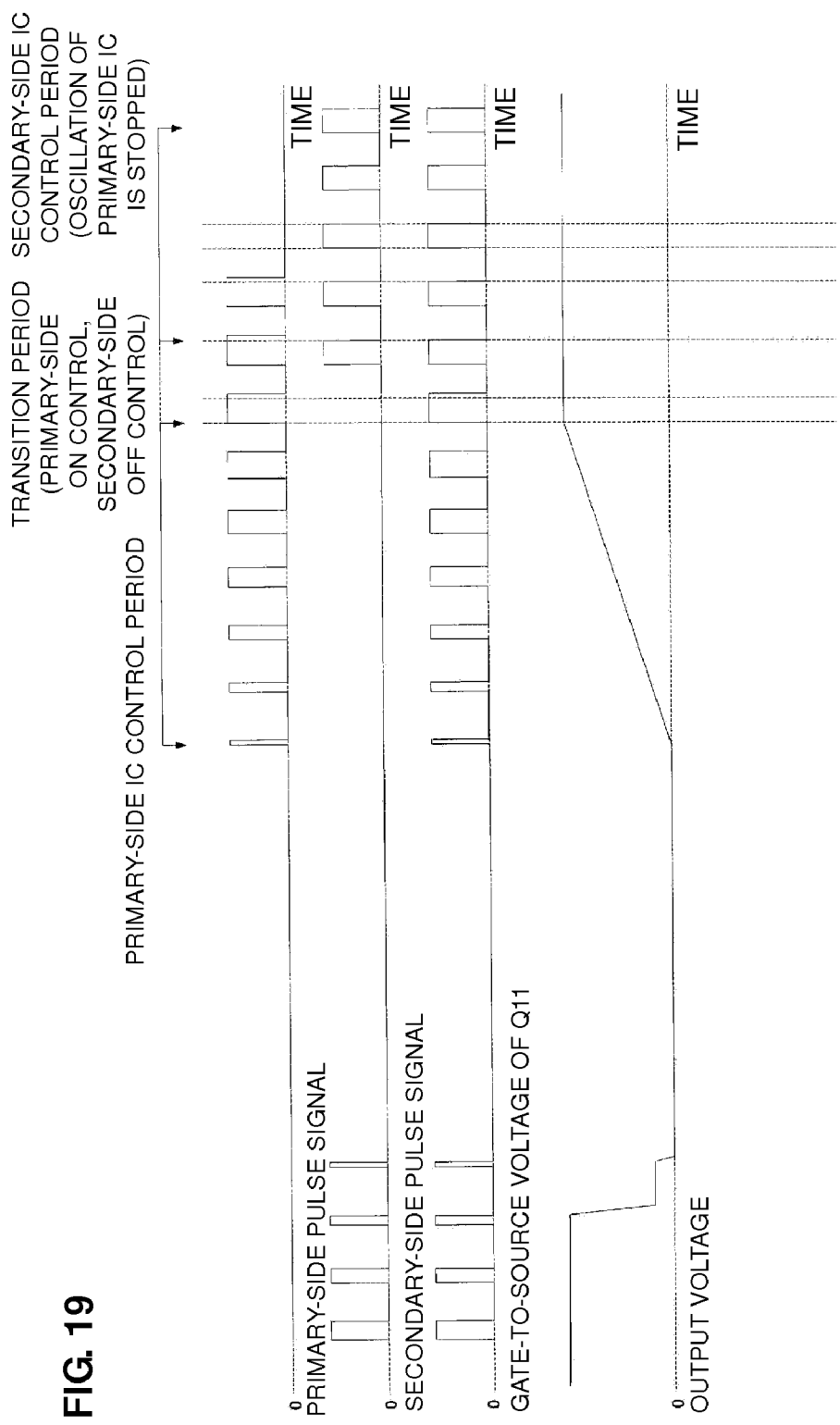
FIG. 19 is a waveform diagram describing operations in a switching power supply apparatus according to the first preferred embodiment of the present invention in a hiccup mode.

When one of the primary control unit and the secondary control unit which does not transmit the turn-on instruction signal earlier includes a switching operation stop unit arranged to stop the generation of a turn-on instruction signal and terminate a switching operation, both of the primary control unit and the secondary control unit may preferably terminate a switching operation. This produces highly flexible operation of a protection circuit and highly flexible processing to control a switching operation/termination. For example, when the primary-side control IC 101 detects a low input voltage, an input overvoltage, or an overheat state of a primary-side component and a primary-side control circuit terminates the switching operation of each switching element, driving power is not supplied to the secondary-side control circuit via the pulse transformer PT. Accordingly, when a driving power supply for the secondary-side control IC 102 is not pre-biased, preferably, the secondary-side control IC 102 is stopped and the switching operation of an isolated switching power supply apparatus is terminated. On the other hand, if the secondary-side control IC 102 does not transmit an instruction signal to turn on the eleventh switching element Q11 when detecting a low output voltage, an output overvoltage, or an overheat state of a secondary-side component, a switching operation preferably continues to be terminated unless the primary-side control IC 101 performs transmission of a turn-on signal instead of the secondary-side control IC 102. Using the above-described mechanism, both the primary-side control IC 101 and the secondary-side control IC 102 can terminate a switching operation. When a mechanism that causes the primary-side control IC 101 to oscillate again and restart after a predetermined non-operation period has elapsed is provided, a hiccup operation is achieved. After the restart of the primary-side control IC 101, the above-described soft start operation is performed. FIG. 19 is a waveform diagram describing operations in a switching power supply apparatus according to the first preferred embodiment in a hiccup mode. The waveform of a pulse signal output from the primary-side control IC 101, the waveform of a pulse signal output from the secondary-side control IC 102, the waveform of the gate-to-source voltage of the eleventh switching element Q11, and the waveform of an output voltage at the output terminal Vout are illustrated in this order from the top of FIG. 19. When the primary-side control IC 101 does not oscillate again until a latch state clear signal is input after a switching operation has been stopped, a latch stop operation is achieved.

Second Preferred Embodiment

Figure 20:
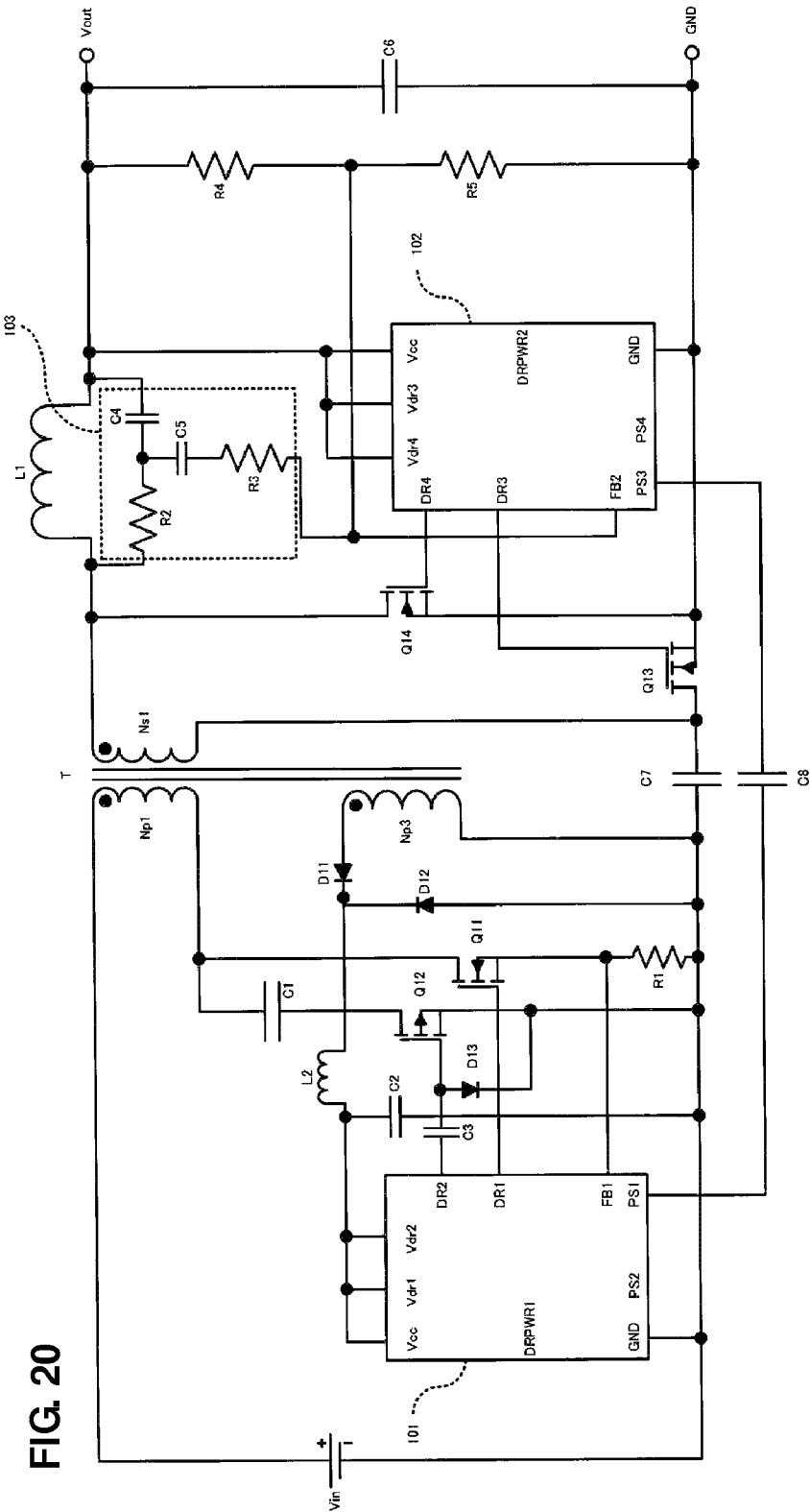
FIG. 20 is a diagram illustrating an exemplary circuit in a switching power supply apparatus according to a second preferred embodiment of the present invention.

FIG. 20 is a circuit diagram of an isolated DC-DC converter according to the second preferred embodiment of the present invention preferably including the control IC illustrated in FIG. 2.

The difference between an isolated DC-DC converter according to the second preferred embodiment illustrated in FIG. 20 and an isolated DC-DC converter according to the first preferred embodiment illustrated in FIG. 3 is that a seventh capacitor C7 and an eighth capacitor C8 are preferably provided instead of the pulse transformer PT. In the first preferred embodiment, a pulse signal including a fundamental wave component of a frequency higher than a switching frequency is preferably transmitted as a timing signal between the primary side and the secondary side via the pulse transformer PT having a relatively small excitation inductance. On the other hand, in the second preferred embodiment, a pulse signal is preferably transmitted between the primary side and the secondary side using capacitors in a state in which isolation between the primary side and the secondary side is established. In this case, the first pulse signal terminal PS1 of the primary-side control IC 101 and the first pulse signal terminal PS3 of the secondary-side control IC 102 are preferably connected via the eighth capacitor C8, and a GND line in the primary-side circuit and a GND line in the secondary-side circuit are connected via the seventh capacitor C7 that function as a common-mode noise reduction filter. The capacitance values of the seventh capacitor C7 and the eighth capacitor C8 are preferably set so that C8<C7, for example, is satisfied. A current flowing between the primary side and the secondary side via the eighth capacitor C8 passes through the seventh capacitor C7 on a return path. The second preferred embodiment can preferably be used when the ground potentials of the primary-side control IC 101 and the secondary-side control IC 102 are not changed by a switching operation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An isolated switching power supply apparatus comprising:
    a direct-current input power supply;
    a power transmission transformer including a primary winding and a secondary winding;
    at least one main switching element arranged to perform switching control on a direct-current voltage applied to the primary winding of the power transmission transformer;
    a rectification circuit including at least one rectification switching element and being connected to the secondary winding of the power transmission transformer;
    a smoothing circuit connected to the secondary winding of the power transmission transformer; and
    a control circuit including a primary control unit arranged to control the at least one main switching element, a secondary control unit arranged to control the at least one rectification switching element, and an isolated signal bidirectional transmission element connected between the primary control unit and the secondary control unit; wherein
    an input/output conversion ratio is controlled in accordance with a duty ratio of the at least one main switching element;
    the isolated signal bidirectional transmission element defines a signal transmission path via which a timing signal corresponding to a turn-on time or a turn-off time of the at least one main switching element can be transmitted between a primary side and a secondary side;
    the primary control unit includes at least one primary drive switch arranged to drive the isolated signal bidirectional transmission element, a primary digital control unit arranged to control a time of driving of the at least one primary drive switch, and a primary detection unit arranged to detect an output of the isolated signal bidirectional transmission element;
    the secondary control unit includes at least one secondary drive switch arranged to drive the isolated signal bidirectional transmission element, a secondary digital control unit arranged to control a time of driving of the at least one secondary drive switch, and a secondary detection unit arranged to detect an output of the isolated signal bidirectional transmission element; and
    the primary detection unit and the secondary detection unit are arranged to turn on or turn off the at least one main switching element and the at least one rectification switching element, respectively, when detecting the timing signal, and the at least one main switching element or the at least one rectification switching element is turned on or turned off in response to the timing signal that has been transmitted earlier from the primary control unit or the secondary control unit.

2. The isolated switching power supply apparatus according to claim 1, wherein
the timing signal includes an ON timing signal generated when the at least one main switching element is turned on and an OFF timing signal generated when the at least one main switching element is turned off;
one of the primary control unit and the secondary control unit which has transmitted the ON timing signal earlier determines a switching frequency;
one of the primary control unit and the secondary control unit which has transmitted the OFF timing signal earlier performs a feedback operation; and
the input/output conversion ratio is controlled in accordance with the duty ratio of the at least one main switching element.

3. The isolated switching power supply apparatus according to claim 2, wherein one of the primary control unit and the secondary control unit which does not transmit the ON timing signal earlier includes a switching operation stop unit arranged to stop generation of the ON timing signal and terminate a switching operation.

4. The isolated switching power supply apparatus according to claim 3, wherein the switching operation stop unit in the secondary control unit terminates the switching operation by shutting off driving power for the secondary control unit transmitted from the primary side to the secondary side via the isolated signal bidirectional transmission element.

5. The isolated switching power supply apparatus according to claim 1, further comprising:
an output current detection unit arranged to directly or indirectly detect an output current; wherein
when the output current detection unit detects a light-load condition, a power saving operation is performed to set an ON timing signal generation cycle to be longer than that in a heavy-load condition, to reduce a switching frequency, and to reduce a fixed loss resulting from switching of each switching element.

6. The isolated switching power supply apparatus according to claim 5, wherein
the at least one rectification switching element includes a synchronous rectifier; and
when the light-load condition is detected, an ON period of the synchronous rectifier is set to be shorter than that in the heavy-load condition, or the synchronous rectifier is maintained in an OFF state and backflow of a current to the synchronous rectifier is prevented.

7. The isolated switching power supply apparatus according to claim 1, wherein the isolated signal bidirectional transmission element is a signal transmission transformer that is connected between the primary control unit and the secondary control unit and includes a primary winding and a secondary winding.

8. The isolated switching power supply apparatus according to claim 1, wherein
the isolated signal bidirectional transmission element is a first capacitor connected between the primary control unit and the secondary control unit; and
a second capacitor is connected between a ground at the primary control unit and a ground at the secondary control unit and defines a return path for a current passing through the first capacitor.

9. The isolated switching power supply apparatus according to claim 1, wherein the timing signal, which is bidirectionally transmitted between the primary side and the secondary side via the isolated signal bidirectional transmission element, is a substantially square wave signal including a fundamental wave of the switching frequency, and is switched between a high level and a low level when the at least one main switching element is turned on or turned off.

10. The isolated switching power supply apparatus according to claim 1, wherein the timing signal, which is bidirectionally transmitted between the primary side and the secondary side via the isolated signal bidirectional transmission element, is an edge signal including a fundamental wave of a frequency greater than the switching frequency, and is generated when the at least one main switching element is turned on or turned off.

* * * * *